United States Patent
Turner

(10) Patent No.: US 7,848,992 B2
(45) Date of Patent: Dec. 7, 2010

(54) RATE OF RETURN STOPS AND CAPITAL RETURN TRANSACTIONS

(76) Inventor: Cyril J. Turner, P.O. Box 53136, Atlanta, GA (US) 30355

( * ) Notice: Subject to any disclaimer, the term of this patent is extended or adjusted under 35 U.S.C. 154(b) by 956 days.

(21) Appl. No.: 11/281,632

(22) Filed: Nov. 17, 2005

(65) Prior Publication Data

US 2006/0167779 A1 Jul. 27, 2006

Related U.S. Application Data

(60) Provisional application No. 60/628,844, filed on Nov. 17, 2004.

(51) Int. Cl.
*G06Q 40/00* (2006.01)
(52) U.S. Cl. .................................................. 705/37
(58) Field of Classification Search .................... 705/37
See application file for complete search history.

(56) References Cited

U.S. PATENT DOCUMENTS 6,061,661 A * 5/2000 Hagan ...................... 705/36 R
6,411,939 B1 6/2002 Parsons
2002/0194106 A1 * 12/2002 Kocher ........................ 705/37
2003/0120575 A1 6/2003 Wallman
2006/0069639 A1 * 3/2006 Kalt ............................ 705/37

OTHER PUBLICATIONS

Harris, Larry, "Trading and exchanges: market microstructure for practitioners", 2003, p. 309.*

* cited by examiner

*Primary Examiner*—James A Kramer
*Assistant Examiner*—Eric T Wong
(74) *Attorney, Agent, or Firm*—Ballard Spahr LLP

(57) ABSTRACT

A method and system for managing and selling investments via electronic means. An investor can establish sell order criteria based upon a preset desired rate of return. The broker thereby monitors the investment and automatically sells it on behalf of the investor once the prescribed sell order criteria are met. The investor can effectively lock in a rate of return prior to its sale without monitoring. Also provided is a method and system for returning to the investor a portion of the initial investment. Once the investment reaches a predetermined value, three simultaneous events occur. A portion or all the initial invested capital is returned to the investor for purposes of reinvestment. The investment instrument is transferred to the broker as collateral, given that its value appreciated relative to the initial purchase amount. Yet the investor still owns the "rights" to the capital appreciation for the life of the investment.

19 Claims, 15 Drawing Sheets

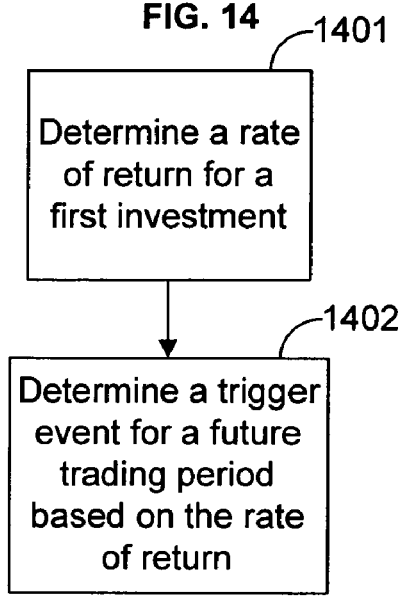
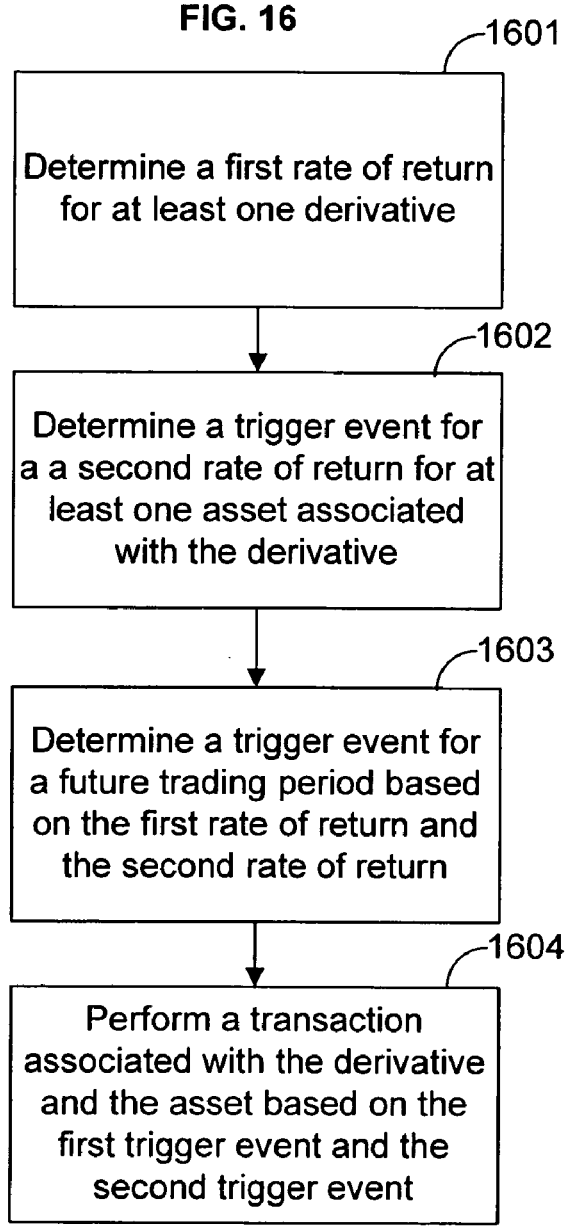
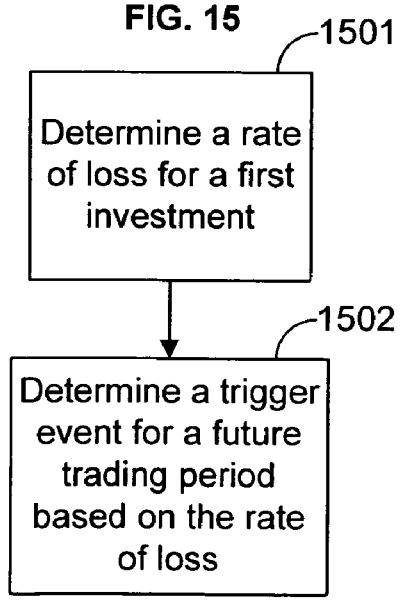

RATE OF RETURN STOPS AND CAPITAL RETURN TRANSACTIONS

CROSS REFERENCE TO RELATED PATENT APPLICATIONS

This application claims priority to U.S. Provisional Application No. 60/628,844 filed Nov. 17, 2004, herein incorporated by reference in its entirety.

TECHNICAL FIELD

An embodiment of this invention involves a computer method and system for automatically selling investments based upon a preset rate of return criteria, relative to the initial purchase price or relative to other investments. It also relates to a method and apparatus for returning some portion of the initial capital, once a predetermined appreciation level is met, while simultaneously preserving the investor's right to the capital gains.

BACKGROUND OF THE INVENTION

There are two major components of this invention. The first involves the utilization of a minimum annualized rate of return (or maximum rate of loss) in determining when an investment is automatically sold. This rate of return can be relative to the initial purchase price and/or relative to other investments. The second aspect involves a mechanism that allows for all or a portion of the invested capital to be returned to the investor once a predetermined capital gain criterion is met. Even though the broker returns a portion of the underlying capital, the investor continues to enjoy the capital gains until such time the investment is sold. In exchange for this privilege, the broker could command a higher commission rate from the investor, perhaps by sharing a percentage of the capital gains.

Rate of Return Stop

Investors carry a heavy burden of monitoring the value of their investments. From the time of purchase until such time the investment is sold, they must constantly monitor the value of the investment. This monitoring burden is compounded when numerous investments have been purchased. Factoring in price volatility, the need to continuously monitor the valuation is further intensified.

There are numerous methods to either monitor the valuation of investments or sell them on behalf of investors. One major difference between the present invention and other "sell order stops" is that "rate of return stops" monitors what matters most to investors—the rate of return, not just an absolute gain.

Some of those "sell order stop" methods simply monitor and notify the investor when an absolute predetermined value is met. Other methods communicate and/or actually trigger a sell order automatically once the investment reaches predetermined valuation level. Often the "trigger" price is based upon some value below the initial purchase price, thereby protecting from further loss; or it is based upon a predetermined appreciation level, thereby preserving the capital gain. For example, a notification and/or sell order may be automatically executed if a stock falls below $95 or above $100. Basic stop and limit orders have been in existence for decades.

Some stop orders are highly sophisticated. trailing stops, for example, follow the appreciated value of the investment. The sale of the investment is based upon the highest appreciated value, less a predetermined amount. For example, a stock purchased at $50 that appreciates to a high of $60 may be triggered by a sell order once the valuation reaches $58, or, stated differently, its highest valuation amount, less a predetermined value of $2. Other versions of the same concept include, "Turtle Trading", "Price Channel Breakouts" and "Donchian Breakouts". In all these instances, the trigger price is based upon an absolute market value of the investment—not the investor's rate or return.

There are a number of inherent risks in these approaches. The notification only approach could cause a delay in reaction time. The investor that receives the phone call must find time to request a sell order via a broker or electronically. In that time, the valuation could decline. Either the amount of the appreciated gain is lost or, worse, the delayed reaction time may even wipe out a portion of the initial invested capital.

Even those methods that trigger a sell order automatically have a major inherent risk. They do not take into consideration each investor's desired rate of return. The sell order triggers are based upon an absolute value—either relative to the initial purchase price or the highest valuation—not what the investor desires from a rate of return perspective. For example, the rate of return for a stock purchased at $50 and sold at $58 is very different from the rate of return on a $100 purchase that is sold at $108. In both cases the capital gain value is $8. However an $8 gain on $50 is a 16% return; versus an 8% gain on $100.

These other approaches also do not take into account the "time value of money". What investors care about more than anything else is their rate of return. Not an absolute appreciation value. This is a critical distinction relative to traditional approaches.

Which has a better rate of return, a stock that is purchased at $100 and sold 30 days later at $103, or the same stock purchase that is sold in 200 days at $108? If the more traditional approaches were used, the trigger price would likely be $108, or a 15% annualized return. Conversely, if a rate of return approach were used, the stock would have been sold at $103, or a 43% annualized rate of return. In the former, dollar based approach, 170 days—and 3 times the rate of return—would have been wasted. In the latter case, the investor can fully capture the 43% annualized rate of return and then reinvest in other high return investments, thereby compounding the cumulative rate of return.

Another consequence of using either the basic stop orders or more sophisticated versions of stop orders is they actually cause more volatility in the market. If a large percentage of investors choose to sell based upon similar valuation based criteria, then the market price will drop precipitously. Under such circumstances there are simply too many sellers relative to buyers. The rate of return approach significantly limits the onslaught of sellers. Since each investor purchases at a different prices, at a different time-frame, and each have a unique rate of return criteria, the likelihood of numerous investors wanting to sell at the same time is sharply reduced, thereby reducing potential market volatility.

Another common means of protecting a loss relative to the initial investment value is the use of options. Options provide the investor with the right—not the obligation—to purchase (in the case of "call options") the underlying investment. For example, an option that is purchased on a stock that is trading at $75 and has a strike price of $80 wouldn't be a loss to an investor if the stock never exceeds $80—other than the transaction costs (the price of the option plus commissions). Therefore the risk of losing the transaction cost on options is very likely, relative to other investment types. They also have other limitations. They also do not take into account the investor's unique rate of return or the "time value of money".

They also have a limited duration in which they expire. Rate of return stops can last in perpetuity so long a sell order is not triggered.

With options investors not only need to constantly monitor the option price itself, but they also have to simultaneously monitor the price of the underlying asset. If the option price increases, the investor may choose to sell the option itself. If the value of the underlying asset improves relative to the absolute value of the "strike price", then the investor may "exercise" the option.

Futures, another common investment instrument, have many of the same limitations as options. In addition, futures are largely limited to commodities, such as grain, livestock, metals, currency, and oil—not all asset types.

The present invention can be used on the purchase of stocks, bonds, options, futures, indices, mutual funds and all other investment instruments that have market based fluctuating valuations.

In the same way a minimum rate of return can be established at the time or purchase or thereafter, the maximum rate of loss can also be utilized. An investor, for example may establish a minimum annualized rate of return of 10% and a maximum annualized rate of loss of 4%. Therefore the investor can simultaneously minimize a loss and protect a capital gain.

Another unique advantage of rate of return stops is to compare rate of return relative to other investments. In particular an investor can choose to trigger a sell order in the event other investment(s) are significantly outperforming the current investment. For example, if the current investment at the prevailing market price has a rate of return of 1%, and comparison investment(s) have returns of 5-6%, the investor may choose to trigger a sell order and/or purchase order to buy those comparison investments. There are no known stops or financial instruments that have such a comparison on a relative basis.

So rate of return stops have a number of advantages over traditional stops and even other financial instruments. It addresses what matters most to investors—the annualized rate of return. They can be used on all assets types, they are not limited in duration, and they are less volatile in the general market.

Capital Return

In today's investment environment, when an investment is made, the initial capital is tied up until such time it is sold. Meanwhile other investment opportunities come and go, leaving the investor on the sidelines from other, potentially more lucrative investment opportunities. The investor is faced with a dilemma: either sell the current investment to reinvest in yet another, or hold the current investment in hope of generating a better overall return. Both options have inherent risks.

Another alternative is for the investor to take out a loan, using the investment as collateral. With exception to brokerages, most financial institutions would not consider such a loan, given the uncertainty of future valuations. Other financial institutions would only offer a loan at 60% of less of the valuation, and likely charge a higher interest rate. In either scenario, financial institutions view collateral against investments as risky because of price volatility and, most importantly, because they do not control the conditions at which the investment is sold.

Certainly the investor has the option of "buying on margin"—or borrowing from the broker at the time of purchase. This allows investors with the ability to in effect hold aside a portion of their investment capital until such time another investment opportunity comes available. Not only do margin accounts involve a interest payment for the privilege of borrowing, but brokers are limited in the percentage of the investment value they can loan. Typically this limitation is 40%. Another consequence of holding aside investment capital is that those finds are not generating a sizable return. Investors that hold funds in money market and other high liquidity accounts, get a very low rate of return. This rate of return is far lower than the cost of borrowing on a margin account, thereby creating a net loss transaction.

Another aspect of this invention involves a guaranteed sell order price. Today when a sell order price is established (either manually or via sell order stops), the sell order itself is not initiated until the current market price equals the threshold price. Since other investors' sell orders may be "ahead," those are processed first. By the time the sell order is actually executed, the market price may have worsened. The guaranteed sell order price would eliminate the investor's risk of price deterioration, wherein the broker anticipates the best timing to sell the investment. The guaranteed sell order price applies to rate of return, capital return and all traditional transactions.

SUMMARY OF THE INVENTION

In an embodiment, the present invention provides a method and system for accomplishing two major objectives on investing: establishing the sell order criteria based upon a preset desired annualized rate of return, relative to the initial purchase price or relative to other investments; and facilitating the return of some portion of the initial invested capital, while simultaneously maintaining the investor's right to ongoing capital gains.

Rate of Return Stop

The rate of return aspect involves the establishment of preset criteria in which the investment is sold. The investor, at the time of purchase or thereafter, communicates sales criteria to the broker based upon the investor's uniquely desired rate of return. These criteria may be established in any combination of the following forms: a minimum rate of return on capital gains, and a maximum rate of loss.

The investor or broker enters in these criteria into a computer system that monitors the market value of the investment relative to these maximum and minimum rates of return.

Upon setting these criteria, the investor and broker needn't monitor the prevailing market value of the investment. If the market value stays within the prescribed minimum and maximum rate of return parameters, then no action is taken. If the stock appreciates beyond the minimum desired rate of return, the investment is automatically sold for a rate of return above the investor's expectations. Conversely, if the market value approaches the preset maximum rate of loss, the investment is automatically sold, thereby protecting against further loss.

Once the investment is automatically sold, a computer system can automatically send a notification to the investor and/or the broker. At that time, the proceeds can be reinvested.

The rate of return approach embodied in this invention can also be combined with other traditional approaches. For example, an investor may request a rate of return of 10% and a minimum stop order gain of $3 per share. For a purchase price of $25, the sell order wouldn't trigger until $28. Even though the 10% rate of return criteria is met at $27.50 at the end of year one, the $3 requirement would supersede, and thereby not trigger a sell order. The stock is only sold in the when the greater of $3 or a 10% annual return condition is met.

Just as rate of return stops can be established relative to the initial purchase price of the investment, they also can be established relative to the performance of other investments. Suppose an investor wants to realize a rate of return above that of the market. Using the S&P 500 (Standard & Poor's) as a proxy for market performance, the investor may wish to be notified and/or a sell order transaction executed in the event the market outperforms the initial investment by more than 5%.

Suppose that at the time the investor purchases a stock at $100 the S&P 500 is at 1,200.00. In one year the stock is valued at $101, or a 1% return. The S&P 500 index, meanwhile, is 1,278.12, or a 6.5% return.

|  | Purchase Price | 1 Year Market Price | Rate of Return |
|---|---|---|---|
| Stock | 100.00 | 101.00 | 1.0% |
| S&P 500 | 1,200.00 | 1,278.12 | 6.5% |

$$\text{Relative Rate of Return} = \left(\frac{1278.12/1200.00}{101.00/100.00} - 1\right) * 100\% = 5.5\%$$

This suggests that other stocks represented in the S&P 500 are outperforming the investor's holding and, consequently, the investor may choose to sell the existing stock and purchase the index itself, or a stock(s) represented in the index.

The following is a generic representation of the relative rate of return calculation.

$$\text{Relative Rate of Return} = \frac{(R2/R1)^{(1/nr)}}{(S2/S1)^{(1/ns)}} - 100\%$$

S1=Initial value of the existing investment
S2=Current market value of the existing investment
R1=Initial value of the investment being compared
R2=Current market value of investment being compared
ns=Duration period of the existing investment
nr=Duration period of the investment being compared Note that the duration periods can be different. The duration period of the existing investment is the length of time it is owned. The duration of the comparison investment can be the same or less than that of the existing investment. For example, while holding the existing investment, the investor may choose to start tracking the relative performance of an index.

Alternatively the comparison can be based upon the absolute rate of return difference between the existing investment and the comparison investments. In the previous example, the absolute difference is 5.5% (6.5%-1%), or generically:

$$[(R2/R1)^{(1/nr)}] - [(S2/S1)^{(1/ns)}]$$

Comparisons can be relative to more than one investment. For example, an investor can choose to simultaneously compare to the Dow Jones Industrial Average (DJIA), S&P 500, individual stocks, or other financial instruments. A point can be set at which a pre-set condition is met relative to any one of the comparison investments, whereby the investor is notified and/or the investment is automatically sold.

This comparison approach can also trigger a simultaneous notification, sell order, and purchase order. For example, an investor may be considering the purchase of a new stock. The investor in turn modifies the relative rate of return criteria of an existing stock holding to compare against the prospective stock. If at some future point the relative return of the prospective stock exceeds the criteria set for defining a trigger event for the existing stock, the existing stock is automatically sold and the prospective stock is automatically purchased. Unlike most sell order transactions wherein the cash generated from the sale sits dormant until such time a new investment can be researched and subsequently purchased, this preplanned investment approach immediately converts the cash into a new investment. By eliminating the dormant periods between investments, the investor's overall rate of return is improved.

Given that multiple investments can be simultaneously compared, purchase criteria can be established on the basis of selecting the best performing comparison investment at the time of the sale of the existing investment. Since short-term market information can be more meaningful, comparison investments can be evaluated on a rolling timeframe (e.g., a rolling 3-month period). This rolling approach and evaluating shorter timeframes, provides more sensitivity in determining relative pricing on prospective investments.

Another aspect embodied in this invention is to simultaneously compare the relative valuations—on a rate of return basis—of options and futures themselves as well as the valuation of the underlying asset. By simultaneously evaluating the greater return of the stock option price itself, the underlying stock, and the stock gain relative to the option price, the investor has a greater chance of recognizing a significant return on invested capital. One skilled in the art would recognize that such simultaneous monitoring does not exist on an automated basis. This applies not only to stocks, but also bonds, commodities, and other types of underlying assets.

This simultaneous monitoring can be done singly or in aggregate. By monitoring multiple investments singly, an investor can choose at a point in time to sell only those investments that exceed a minimum rate of return. Alternatively, multiple investment values can be aggregated to determine the best rate of return of the combined investment values. For example an investor can employ a straddle strategy on options in which simultaneous "out of the money" "call" and "put" options are purchased on the same underlying asset. As the market value changes on the underlying asset, the "call" option value may improve at a greater rate than the "put" option value degrades, or vice versa. By simultaneously evaluating the investment values singly and in aggregate, the best rate of return combination can be triggered. (Note that the capital loss on the declining investment can be evaluated on a tax-adjusted basis.)

As seen in FIG. 16, this method for managing an investment can determine a first rate of return for at least one derivative, 1601. The method can determine a second rate of return for at least one asset associated with the derivative, 1602. The method can determine a trigger event for a future trading period based on the first rate of return and the second rate of return, 1603. The method can perform a transaction associated with the derivative and the asset based on the first trigger event and the second trigger event, 1604. The first rate of return can be the same as the second rate of return. The derivative can be an investment such as, an option, Exchange Traded option, Exchange Traded Fund (ETF), futures contract, warrant, convertible bond, and financial contract. The asset can be an investment such as, a stock Exchange Traded Fund (ETF), bond, currency, index, and mutual fund. An ETF's are blocks of specific, unmanaged stocks that can be bought and sold in the market place just like an individual stock. Exchange traded funds can be used to obtain broad market exposure in specific investment sectors, such as real estate, biotech or high tech, without having to buy individual stocks.

The trigger event can occur when the current market rate of return for the derivative is greater than the first rate of return. The transaction can be selling the derivative. Alternatively, the trigger event can occur when the current market rate of return for the associated asset is greater than the second rate of return. In that case, the transaction can be exercising the derivative to purchase the associated asset.

The first rate of return and the second rate of return can be adjusted for a factor such as transaction costs, management expenses, tax consequences, dividends, DRIPS's and bond coupons.

Even when investments are purchased at differing time frames and at varied purchased amounts, an aggregate rate of return can be calculated. By evaluating the timing and amount of the cash flows, an investor can make an informed decision on either the aggregated rate of return on multiple investments, or each singly. Clearly the aggregation technique can evaluate the best combinations of investments. Therefore instead of selling investments A, B, and C either singly or in total, the best after-tax rate of return combination may be the sale of investments A and C. This embodiment too, is a clear distinction from traditional stop orders.

Tax consequences can be taken into account when determining a rate of return. The tax treatment of capital gains in losses for various tax jurisdictions (federal, state, or any other taxation entity, including other countries), also factors into the rate of return treatment. Since many taxation entities reward the long-term holding of capital gains, the investor can factor personal taxation rates at various time frames. For example, the investor can select a higher rate of return during the early, high taxation period. In effect the investor manages to an after-tax rate of return by demanding higher rate of return as a means of paying for early capital gains. Beyond the initial period, in which capital gains are tax favored, the investor can adjust downward the desired rate of return.

What follows is an example of tax impact of on a rate of return calculation. Suppose an investor purchases a $100 stock on January 1. The investor simultaneously establishes a tax adjusted rate of return threshold of 8%. Suppose that on December 31 the stock is trading at $110. This represents a 10% increase in absolute terms. However, given that capital gains are taxed as ordinary income for stocks held for less than a year, this $10 gain would be taxed at the investor's personal income tax rate—say 35%. Therefore the after-tax value is $6.50 ($10−$10×35%). So this is only a 6.5% after-tax return—well below the 8% after-tax threshold.

For stocks held for a year or more, the capital gains tax falls to 15%. So if on the next day, January $1^{st}$, the stock is still trading at $110, the after tax return is $8.50 ($10−$10×15%). This 8.5% return is above 8% after-tax threshold and, consequently, a sales transaction would trigger.

Other cash flows that have an impact on the rate of return include dividends, DRIPs and bond coupons. Dividends are paid to the investor usually on a quarterly basis. Beyond appreciation, this is an incentive that companies provide investors for holding its stock. Because this is an incremental value to the investor, it can be included in the rate of return calculation. For example, an investor can choose to wait until the fiscal quarter closes to qualify for a dividend and thereby improve their overall rate of return.

Another treatment of a dividend is to automatically have the proceeds reinvested in the stock. Dividend reinvestment programs (DRIPS) are common and have the added benefit of having very low associated commissions. Therefore the value elements of a DRIP (incremental stock and commission cost) can also factor into the rate of return.

Bond coupons represent another type of cash flow associated with investments. A bond is simply a securitized "loan." The interest payment to the investors, called a bond coupon, is typically paid to the bondholder semiannually. Some bonds, for example municipal bonds, have a lower tax basis. Consequently all elements of a bond (coupons and favorable tax treatment) can to be factored into the rate of return calculation.

The rate of return approach embodied in this invention also considers that the rate of return trigger can represent the market price at which an investment is sold, or a new "floor price". For example, a $100 bond at the end of year one with 10% rate of return expectation could trigger a sell order once the market price appreciates past $110. Alternatively, upon crossing the 10% annualized rate of return, so long as the market value doesn't decline below 10% the bond continues trading. If at the 1½ year mark bond declines to $115.37, then the bond is automatically sold. The 10% expectation is still met, yet it yielded another $5.37 per share.

The rate of return approach can also be used on a progressive basis. The investor can provide sales instructions that trigger a sell order if the change in the rate of return declines by a predefined number of percentage points. For example, if the present minimum rate of return is 8% and, if upon exceeding that level the change in the rate of return declines by more that 1% point, than the investment would be automatically sold. So if the market value climbs such that the highest achieved rate of return is 11%, the new sell order trigger would be 10%, or the highest appreciated rate of return less 1%.

Capital Return

The Capital Return aspect of the present invention provides the investor with the simultaneous benefit of withdrawing a portion of the invested capital, yet still maintaining the rights to ongoing capital appreciation.

With capital return transactions, the investor and broker enter into an agreement in which the criteria are established that enable the investor to the following benefits: to have a portion of the initial capital returned to the investor for purposes of reinvestment; and to preserve the investor's rights to the capital appreciation even though a portion of the investment has been returned. In exchange for these benefits to the investor, the broker too enjoys some incremental benefits and, simultaneously, reduces transaction risks.

The structure of a capital return transaction, for example, can involve events that occur at two mutually agreed market prices: the market price at which the capital return transaction is triggered; and the market price at which the investment is automatically sold. For example, a bond purchased at $100 can trigger a capital return transaction when the market price reaches $110. It is also mutually agreed that the sell order is automatically triggered if the market value declines from $110 to $105, or if it appreciates to $115. From the time of purchase until such time the investment appreciates to $110, the investment is treated like any standard investment: the investor remains fully vested in the investment and monitors the market price. Once the market value appreciates to $110—the price at which the capital return transaction is triggered—three simultaneous events occur. First, a portion of the initial capital—for example $80—is returned to the investor for purposes of reinvestment. Second, the investment is deeded over to the broker. This in effect becomes collateral, wherein the $110 market value exceeds the $80 value of the returned capital. Third, even though the broker has controlling rights to the investment, the investor maintains the rights to the capital appreciation.

Once the capital return transaction is triggered, the investment remains viable until such time the sell order criteria is met. Using this example, if the market price declines from $110 to $105, the investment is automatically sold. The broker returns $25 ($105 less the $80 in capital previously returned) to the investor. Conversely, if the market value appreciates to $115, the broker returns $35 ($115 less the $80 in capital previously returned) to the investor.

One major distinction between traditional margin borrowing and the capital return aspect of the present invention is that the broker has absolute control of triggering a sell order at an appreciated value (that is agreed to by the broker and investor in advance). The broker has full protection throughout the life of the investment.

Compared to other capital preservation methods, such as margin accounts, the capital return transactions have a number of inherent advantages. "Margin calls", the calls brokers make to investors when the valuation of their investment(s) falls below an acceptable level relative to their margin of borrowing, becomes a thing of the past. The capital return approach actually adds more security to brokerage firms and the markets, alike.

The broker's collateral on a capital return transaction is also superior to margin accounts. With capital return transactions, the investment value appreciates beyond the initial purchase price before a portion of the capital is returned. Therefore the broker has a more positive asset position.

Capital return transactions have other benefits. To the investor, not only is capital no longer tied up, but also there is no interest payment (like on margin accounts). Because the broker returns a portion of capital at a point later than the time of purchase, the broker should be entitled to receive another commission fee that offsets what would have been earned on margin accounts. Therefore the investor defers a cost and thereby improves their rate of return.

Options can provide a limited amount of capital preservation. Instead or buying directly the underlying stock, bond or other asset, the investor purchases indirectly at a fraction of the cost the right to buy/sell the underlying investment. Although the relatively lower capital requirement on options is attractive, there are other risks associated with options. Because options have a limited duration, the time horizon is limited. The transactions costs associated with options (the option cost plus commissions) are expensive relative to other investment alternatives. Options also require constant monitoring because their price tends to be extremely volatile.

At the time of purchase or thereafter, the investor and broker agree upon the conditions in which a portion of the capital is returned to the investor. The agreed to conditions can include the market valuation that triggers the transaction; the criteria at which the investment is automatically sold; and the percentage of the initial capital to be returned.

For example, a stock that is purchased at $50 for 100 shares can follow these steps. The investor and broker agree that once the market valuation reaches $55 that 80% or $4,000 ($40 times 100 shares) of the initial capital will be returned to the investor provided that the investor deed over the stock to the broker and that the broker has the right to automatically sell if the market valuation declines to $52 or exceeds a 12% annual rate of return. In this case the broker holds the stock as collateral—the value of the stock being greater than the value of the returned capital. If the stock declines to $52, the broker has the right to automatically sell, and the proceeds of $12 per share (the $2 gain relative to the purchase price of $50, plus the other 20% of invested capital) is returned to the investor. If in a year's time the stock reaches $57.50, or a 15% return, then the broker automatically sells the stock and returns $17.50 per share (or $7.50 capital gain, relative to the purchase price, plus the other 20% of invested capital).

Throughout this transaction the broker is protected. If the market valuation never approaches the trigger price, then the broker handles it like any other investment transaction. If the $55 trigger condition is met, the agreed to market valuation trigger is greater than the unit value of the returned portion of capital. In the example, the broker has a $15 or 37.5% cushion (the $55 trigger price versus the $40 capital return). The broker is also deeded over the investment as collateral and thereby has the controlling rights to the sell order—for purposes of protecting against a market decline or for protecting an established gain. (Margin calls are no longer necessary.)

The investor has two benefits: capital is returned for purposes of reinvestment; and, simultaneously, the right to continue to enjoy returns on the first investment. The cumulative compounding effect can lead to even sharper returns. Expanding upon the previous example, if the first investment continues to return 15% at the end of year two and the second investment is purchased at the end of year one and earns a 10% return, the combined annualized return is 48.4%, as shown in the example below.

| Year | 1st Investment | 2nd Investment | Combined Return |
|---|---|---|---|
| 0 | $50.00  80% | | |
| 1 | $57.50 | $40.00 | |
| 2 | $66.13 | $44.00 | $110.13 |
| Gain | $16.13 | $4.00 | $20.13 |
| Ann. Return % | 15.0% | 10.0% | 48.4% |

In exchange for this service and the significant returns it can produce, the broker can negotiate a commission based upon a percentage of the gain. Since the investor only pays the incremental commission in the event of a capital gain, the investor and broker mutually benefit. The investor also gets a timing benefit, wherein the incremental commission is paid once the investment is sold, as opposed to early when it is purchased.

Both aspects of the present invention can actually be used on the purchase of stocks, bonds, options, futures, and all other investment instruments that have market based fluctuating valuations. By example, a bond option that is valued at $20, can utilize the rate of return approach that is embodied in this invention. If the desired rate of return is 10%, the bond option trigger would automatically execute a sell order when its value reaches $20.16 or more in 30 days, or $20.46 or greater in 270 days, whichever occurs first. In the case of options and futures, the rate of return approach is based upon valuation of the direct investment—the option or future itself—and simultaneously the underlying asset (a stock, bond or commodity).

One skilled in the art will understand that there are innumerable variations to the capital return concept that yield the same results. For example, the broker needn't "own" or have the investment deeded over, so long as the broker has the "rights" to automatically sell the investment. The broker is fully protected and simply returns to the investor the difference of the price at which the investment is sold and the capital return value.

Another variation involves the price at which the capital return transaction is triggered. For example, the investor and broker can mutually agree to consummate or "trigger" the capital return transaction at the purchase price. For example, an investor can have $100 to invest in several investments, one of which has a market value of $100. Instead of consuming the entire $100 to purchase the single investment, investor and broker mutually agree that for $20 the investor has the "rights to the capital gains" on an investment either owned or purchased by the broker. It is also agreed that the broker will automatically sell the investment if its value declines from $100 to $95, or if it appreciates to $110. In the event of a decline, the broker pays back $15 (the $20 initially paid by the investor, less the $5 loss). Conversely if the investment is sold at $110, the broker pays the $30 (the $10 in appreciation plus $20 initially paid. In exchange for the investor's benefits—rights to the capital appreciation and the ability to preserve $80 in capital to invest elsewhere—the broker is entitled to a commission greater than the standard rate. This incremental commission could be paid for in the form of a portion of the capital gains.

One skilled in the art would also recognize that a "broker" could be any type of intermediary, a full service broker or firm, a discount broker, a specialist, or another financial institution. This commerce can be conducted via the internet, a brokerage system, or a client system.

This invention also provides for a guaranteed sell order price. Today when a sell order price is established (either manually or via sell order stops), the sell order itself isn't initiated until the current market price equals the threshold price. Since other sell orders may be "ahead", those investors' orders are processed first. By the time the sell order is actually executed, the market price may have worsened. The guaranteed sell order price would eliminate the investor's risk of price deterioration. With the price guarantee, the broker anticipates the best timing to sell the investment. For example, a bond trading at $50 per share could have a stop order in the event it declines to $45. In the traditional approach the sell order wouldn't be executed until the market price is $45 or slightly less, thereby exposing the investor to an actual price of less than $45. With the guaranteed approach, the broker is authorized to sell the investment as it approaches $45—say at $46. Using this approach, the actual price at which the bond is sold may be $45.75, a $0.75 cushion relative to the $45 target price. Since the broker assumes the risk, and there is a benefit to the investor not be exposed to a sub-$45 actual sale price, it would be reasonable for the broker to retain all or most of the $0.75 cushion, in lieu of incremental commissions. Since brokers are closer to market activity and will establish an experience base to anticipate the optimal sale timing, an unlikely event is where the broker anticipates too early and the $45 threshold is never met. Fortunately the broker can mitigate the risk in one of two ways. Either the broker can remain in a cash position wait until the market value reaches $45, and realize the $0.75 gain at a later point. Or if the market price suddenly increases, the broker can repurchase the bond as its value improves.

The guaranteed sell order price can apply to rate of return, capital return and all traditional transactions.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 14 is a block diagram showing the determining of a rate of return for a first investment and the determining of a trigger event for a future trading period based on the rate of return aspect of the present invention.

FIG. 15 is a block diagram showing the determining of a maximum rate of loss for a first investment and the determining of a trigger event for a future trading period based on the maximum rate of loss aspect of the present invention.

FIG. 16 is a block diagram showing the determining of a first rate of return for at least one derivative, the determining of a second rate of return for at least one asset associated with the derivative, and the determining of a trigger event for a future trading period based on the first and second rates of return aspect of the present invention.

DETAILED DESCRIPTION OF THE INVENTION

Figure 1:
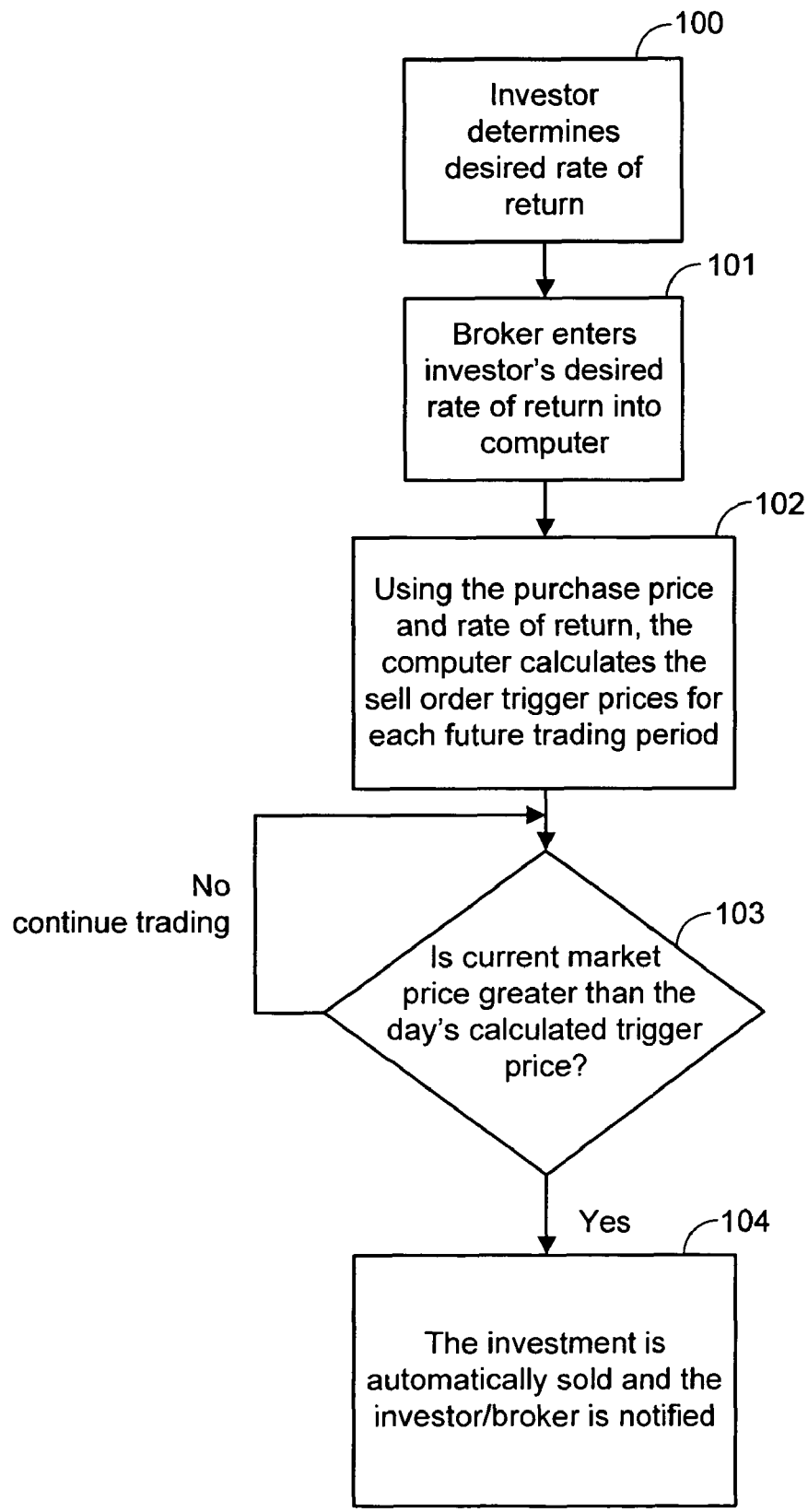
FIG. 1 is a block diagram showing the "rate of return" aspect of the present invention FIG. 2 graphically illustrates the minimum rate of return stop relative to a market price.

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "a stop" includes mixtures of stops, reference to "a stop" includes mixtures of two or more such stops, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present invention may be understood more readily by reference to the following detailed description of embodiments of the invention and the Examples included therein and to the Figures and their previous and following description.

The present invention provides a method and system for accomplishing two major investment objectives. The first enables investors to establish sell order criteria based upon a preset the desired rate of return, as opposed to an absolute value. A computer monitors the market price relative to the investor's desired rate of return parameters and automatically sells the investment once the preset rate of return criteria are met. The invention also encompasses a simultaneous sell/purchase capability. The second major objective is to return some portion of the initial invested capital to the investor while simultaneously allowing the investor to maintain rights to ongoing capital appreciation.

Rate of Return Stop

The rate of return aspect of the present invention enables investors to pre-establish the trigger conditions (also referred to as criteria) under which their investments are automatically sold relative to their desired rate of return. Instead of having to constantly monitor the prevailing market price for purposes of preserving capital gains or minimizing losses, investors can be assured that their investment outcomes are met without constant intervention.

As shown in FIG. 14, disclosed is a method for managing an investment comprising determining a rate of return for a first investment 1401 and determining a trigger event for a future trading period based on the rate of return 1402. The trigger event can occur when a current market price of the first investment is greater than or equal to a sell order trigger price. The method can also determine if a current market price of the first investment is greater than or equal to the sell order trigger price. The method can further increase the sell order trigger price in response to an increase in the current market price of the first investment. The method can also include selling the investment if the current market price of the first investment is greater than or equal to the sell order trigger price and notifying a user, such as an investor or a broker, of the sale.

Alternatively, the trigger event can occur when a current market rate of return of the first investment is greater than or equal to the determined rate of return. The trigger event can occur when a current market rate of return of a second investment is greater than a current market rate of return on the first investment. In this case, the method can also sell the first investment if the trigger event occurs, purchase the second investment and notify user of the sale and purchase.

The first investment can be a group of investments. The group can be a variety of investments such as stocks, bonds, Exchange Traded Funds (ETF's), currency, indices, and mutual funds. The rate of return in the method can be adjusted for a factor such as transaction costs, management expenses, tax consequences, dividends, DRIPS's, and bond coupons.

As seen in FIG. 15, also disclosed is a method for managing an investment comprising determining a maximum rate of loss for a first investment 1501 and determining a trigger event for a future trading period based on the maximum rate of loss 1502. The trigger event can occur when a current market price of the first investment is less than or equal to a sell order trigger price. The method can also determine if a current market price of the first investment is less than or equal to the sell order trigger price. The method can sell the first investment if the current market price of the investment is less than or equal to the sell order trigger price and notify a user of the sale.

Alternatively, the trigger event can occur when a current rate of loss of the first investment is greater than or equal to the determined rate of loss. The trigger event can occur when a current market rate of loss of a second investment is less than a current market rate of loss on the first investment. The method can then sell the first investment if the trigger event occurs, purchase the second investment and notify a user of the sale and purchase.

The first investment can be a group of investments. The group can be a variety of investments such as stocks, bonds, Exchange Traded Funds (ETF's), currency, indices, and mutual finds. The rate of loss in the method can be adjusted for a factor such as transaction costs, management expenses, tax consequences, dividends, DRIPS's, and bond coupons.

As shown in FIG. 1, at the time of the investment purchase, or prior to its sale by the investor, the investor establishes a desired rate of return and/or maximum rate of loss 100. The broker, or other intermediary, enters this rate of return information into a computer system, 101. The computer system calculates for each future trading day the maximum and minimum values that represent the preset rate of return and/or maximum rate of loss relative to the purchase price (with or without factored commission costs), 102. As the market price fluctuates, the computer system constantly monitors the investment value relative to that day's rate of return and/or maximum rate of loss sell order thresholds. If, at 103, the market value does not exceed one of these thresholds, trading continues. If, at 103, the market value exceeds one of these thresholds, the investment can be automatically sold and a notification can automatically be sent to the investor and/or broker, 104. Exceeding a threshold can include an investment rate of return being greater than or equal to an established minimum rate of return. Exceeding a threshold can include an investment rate of return being less than or equal to an established maximum rate of loss.

Figure 2:
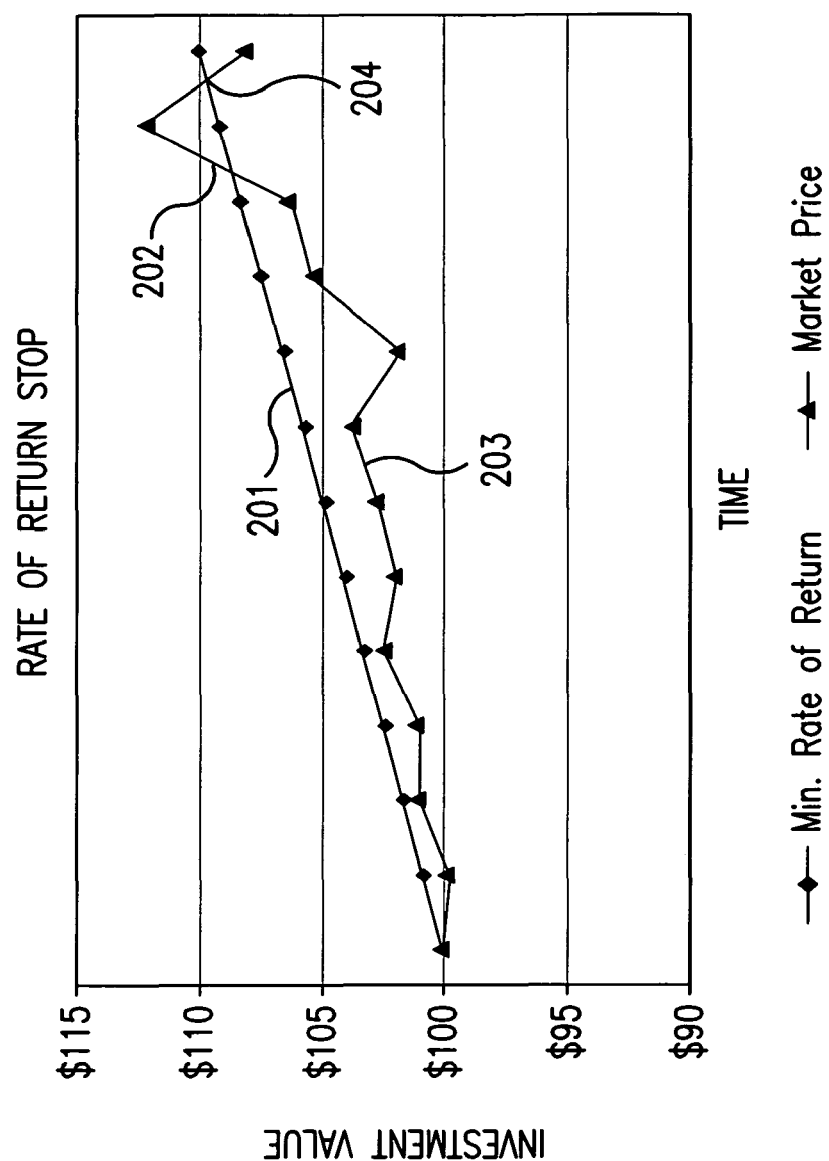

FIG. 2 graphically illustrates the minimum rate of return stop relative to a market price. An investor, at the time of purchase or thereafter, can establish a minimum desired rate of return. For example, a 10% return on an annualized basis. For a stock purchased at $100, a 10% return would be $102.41 in three months, $104.88 in six months, $110.00 in a year, etc. The minimum rate of return plot, 201 in FIG. 2, depicts each trading day's value based upon the purchased price (with possible adjustments for commissions) and the desired rate of return. As time passes, the value increases, representing the time value of money concept, whereby the longer one holds an investment the greater its value.

In one embodiment of this invention, if the prevailing market price exceeds that day's specific rate of return threshold, then the investment is automatically sold. Using the previous example, if at the three month point the market value exceeds $102.41, then the investment is automatically sold. Since this is time based, if throughout the time since the investment is purchased its value remains below a 10% rate of return and, in the eleventh month mark it exceeds about $109, then the investment is automatically sold, thereby locking in the capital gain of about $9. As shown graphically in FIG. 2, the rate inflection point, 202, at which the market price, 203, exceeds the minimum rate of return plot, 201 is the point at which the sell order is automatically triggered.

In another embodiment of the present invention, instead of triggering an automatic sell order as the market value appreciates beyond the desired rate of return threshold, the sell order could be triggered once the market value depreciates back to the desired rate of return threshold. The minimum rate of return plot, 201, shown in FIG. 2 could also prompt a sell order as the market price, 203, passes through inflection point, 202, and subsequently depreciates back toward the minimum rate of return plot, 201, at the other inflection point, 204. This approach for triggering a sell order could yield more capital gains at about the same rate of return. Since the minimum rate or return plot, line 201, continues to increase in value over time, the elapsed time between inflection point, 202, and the other inflection point, 204, represents appreciated value. An inherent risk in triggering a sell order using the approach described in inflection point, 204, is that as the market price, line 203, declines, there is already downward momentum in valuation. By the time the sell order is actually executed, the actual selling price may produce a rate of return slightly below the desired level.

Just as the rate of return stops can be established relative to the initial purchase price of the investment, they also can be established relative to the performance of other investments.

Figure 10:
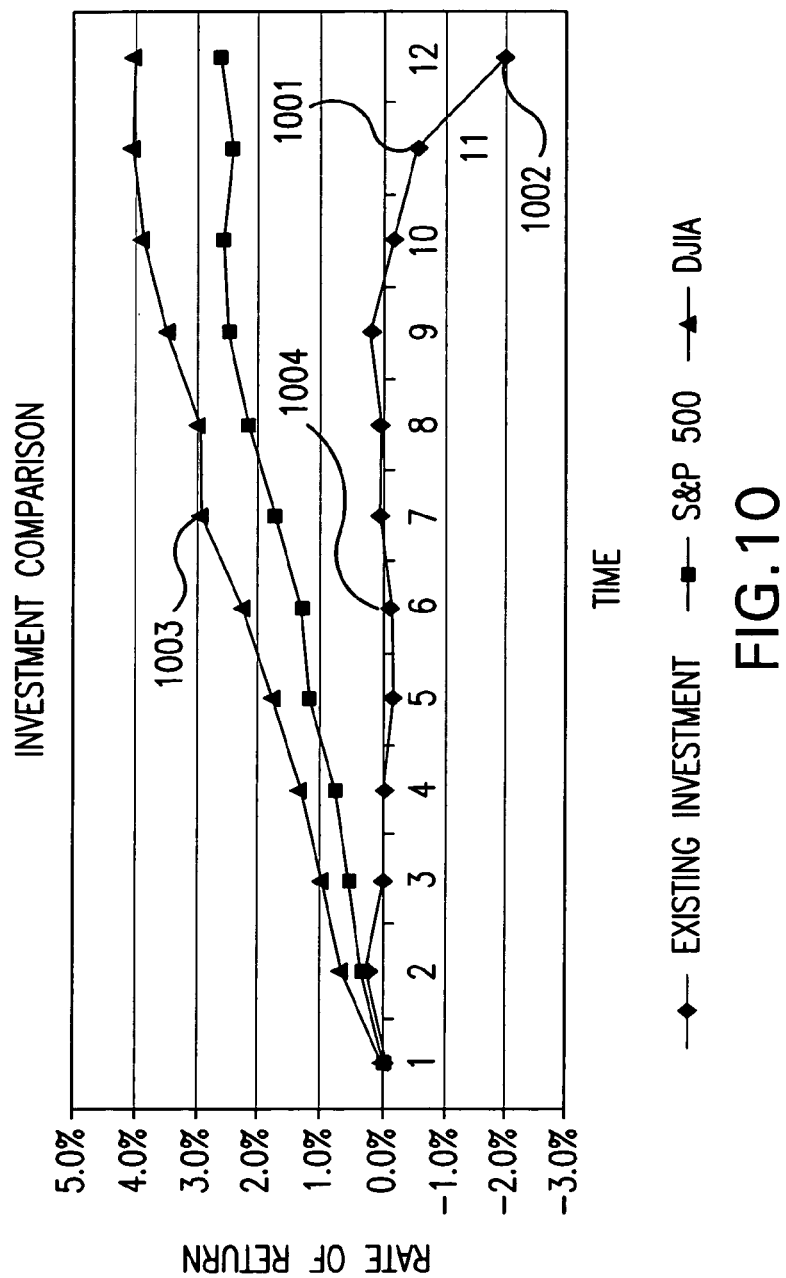
FIG. 10 graphically illustrates establishing a rate of return relative to performance of other investments.

As shown in FIG. 10, the rate of return can be tracked over time on the existing investment as well as one or more comparison investments (for example, DJIA and S&P500). The investor can compare to any number of other investments.

In FIG. 10 the existing investment is declining on an absolute base at point 1001. If the investor established a rate of return stop order to sell the existing investment when its value declined by 2% or more, the investment would be sold at point 1002. However, given the rate of growth of the comparison investments, the investor would have benefited by selling the existing investment earlier and purchasing one of the comparison investments.

Several criteria can be established to trigger a sell order using the relative rate of return stop. For example, one approach involves automatically selling the existing investment when the rate of return on one of the comparison investments reaches a rate of return threshold, provided that the existing investment itself has a sub par return. As shown in FIG. 10, a sell order can be triggered when one of the comparison investments reaches a 3% return, provided the existing investment has no return. In period 7 at point 1003, the DJIA shows a return of 3% and the existing investment has 0% return at point 1004. Therefore both conditions meet the sell order criteria and the existing investment would be sold.

Figure 11:
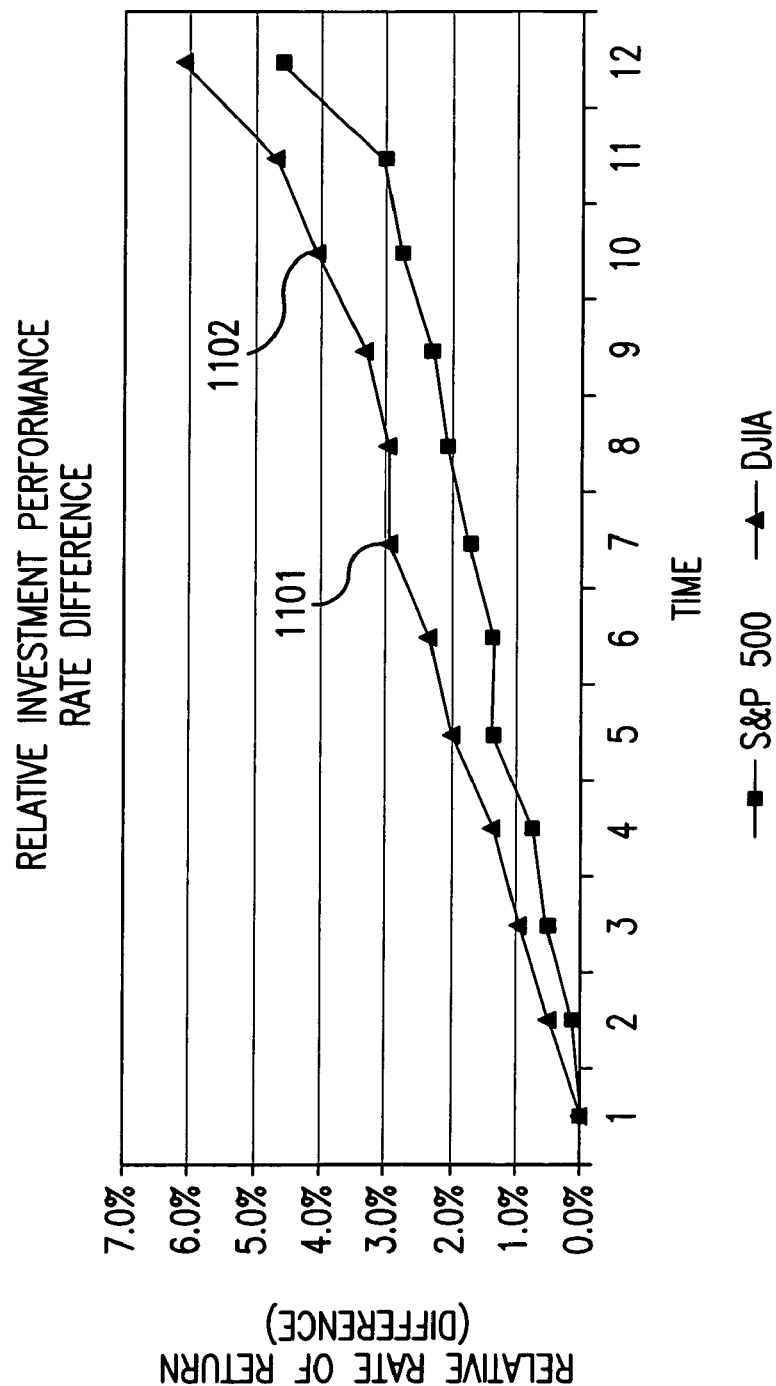
FIG. 11 graphically illustrates the difference in rates of return between the existing investment and the comparison investments.

Another approach can be evaluating the relative rate of return differences when a comparison investment reaches a pre-set threshold. FIG. 11 shows the difference in the rates of between the existing investment and the comparison investments. In this example, the pre-set criteria can be set at 3% rate of return difference, 1101, or a 4% rate of return difference, 1102. In this example, the existing investment can be sold when the rate of return difference is 3% at point 1101. Alternatively, the existing investment can be sold when the rate of return difference is 4% at point 1102, or generically:

$$[(R2/R1)^{(1/nr)}]-[(S2/S1)^{(1/ns)}]$$

Figure 12:
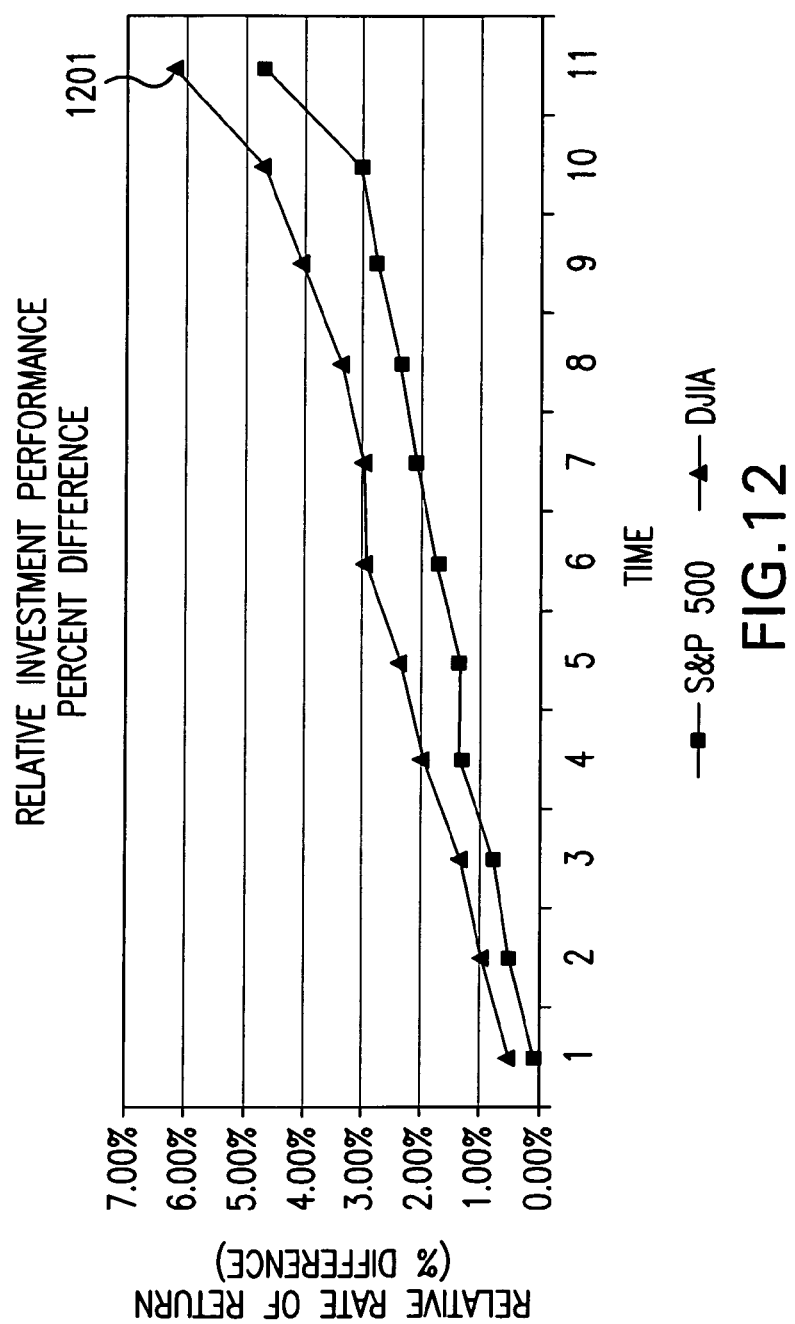
FIG. 12 graphically illustrates returns on a relative rate of return percentage difference basis.

Another approach compares the returns on a relative rate of return percentage difference basis. When the comparison investment has a higher return, this approach measures the incremental return the investor is losing relative to the comparison investments. FIG. 12 shows that at a 6% relative rate of return difference premium, 1201, the sell order is triggered. The following is a generic representation of the relative rate of return calculation.

$$\text{Relative Rate of Return} = \frac{(R2/R1)^{(1/nr)}}{(S2/S1)^{(1/ns)}} - 100\%$$

S1=Initial value of the existing investment
S2=Current market value of the existing investment
R1=Initial value of the investment being compared
R2=Current market value of investment being compared
ns=Duration period of the existing investment
nr=Duration period of the investment being compared Note that the duration periods can be different. The duration period of the existing investment is the length of time it is owned. The duration of the comparison investment can be the same or less than that of the existing investment. For example, while holding the existing investment, the investor may choose to start tracking the relative performance of an index.

Figure 13:
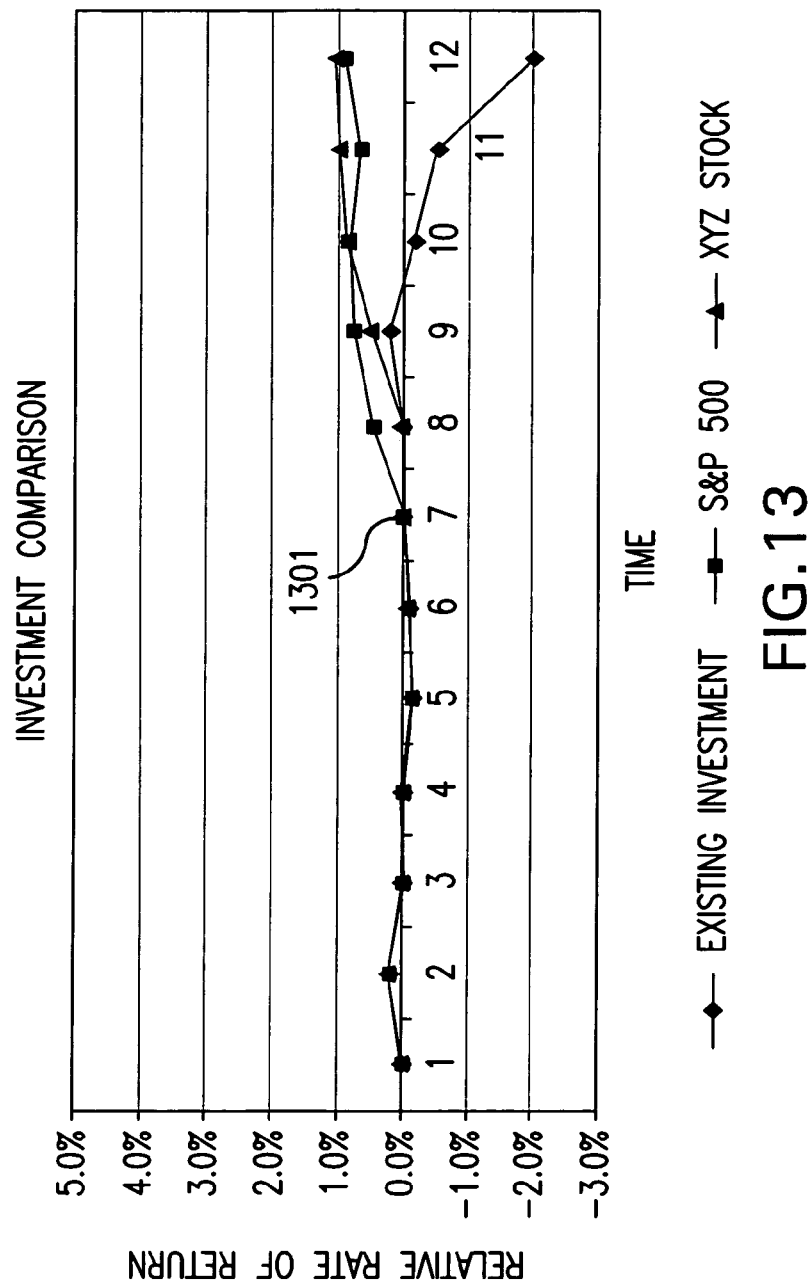
FIG. 13 graphically illustrates establishing a relative rate of return subsequent to an investment purchase.

Regardless of which relative rate of return stop is utilized, the comparison to other investments can be established at any point. For example, an investor can identify a potential investment subsequent to the purchase of the existing investment. Using the relative rate of return, the investor can determine the optimal time to sell and subsequently purchase the new investment. FIG. 13 shows that in period 7 at point 1301, the investor establishes a relative rate of return, comparing the existing investment to the S&P 500 and Stock XYZ. Depending upon the relative rate of return approach used, and the threshold established, the investor can establish criteria for a sell order trigger that automatically sells the existing investment. Subsequently the investor can manually purchase one of the comparison investments or the comparison investments can be automatically purchased at the trigger event.

The relative rate of return stop can trigger an automatic purchase order. Stops (standard, rate or return, and relative rate of return) provide the convenience and protection for selling investments. However, the time at which the investment is sold is uncertain due to price fluctuations. Therefore investors often are placed in a reactive mode to determine their next investment. This time lag between the sale of one investment and the purchase of another creates the potential for losses in the form of unrealized capital gains.

The comparison investments can be selected as immediate alternatives for purchase when the sell order criteria are met. In FIG. 11, for example, a simultaneous sell/purchase order can be placed when the relative rate of return difference is 3%, at point 1101. The purchase side order could be based upon whichever comparison investment is the greatest. In this case the DJIA. Using this approach the rate of return is 1% by the end of period 12, as opposed to losing 2% had the existing investment not been sold. Alternatively, if the existing investment was sold in period 7 and a 3 period time lag occurred before the DJIA was purchased in period 10, the rate of return is 0% at the end of period 12. Therefore the purchase feature of the relative rate of return can protect investors from both an absolute loss, as well as a loss relative to market rates of return.

Figure 3:
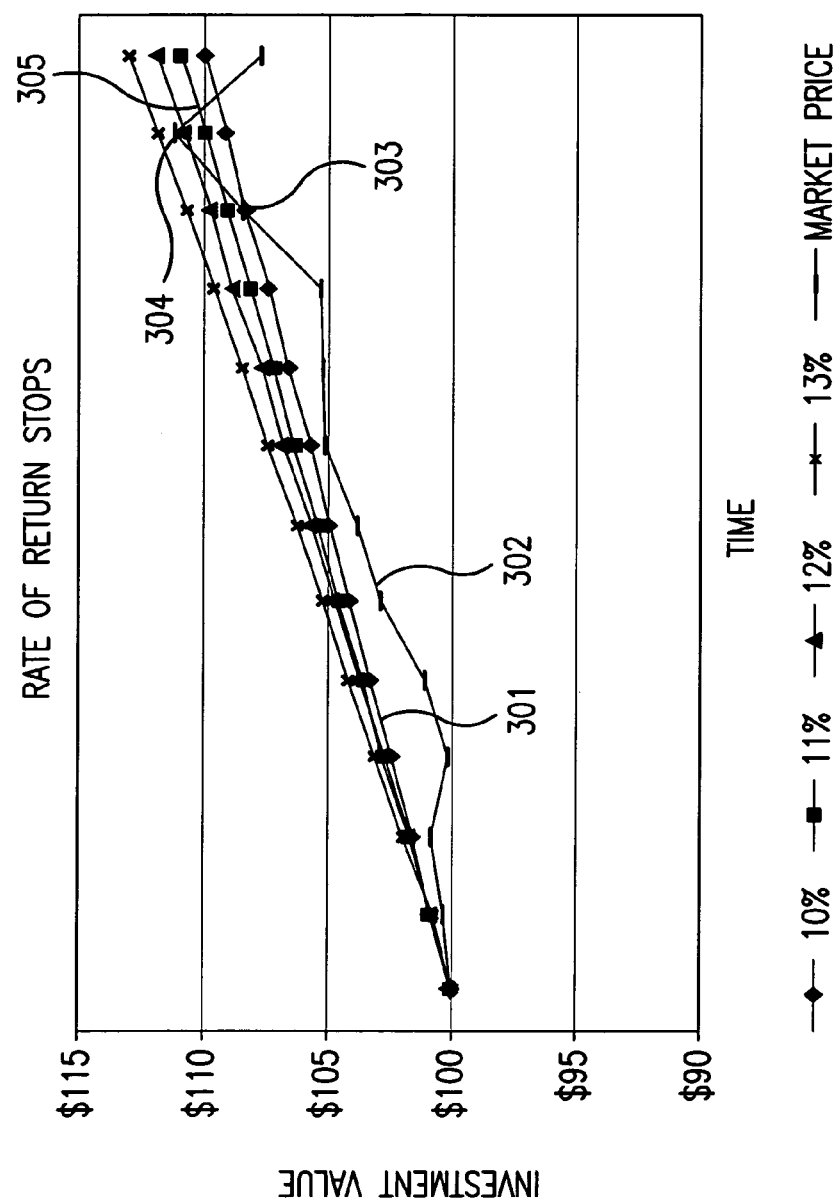
FIG. 3 graphically illustrates the maximum rate of loss stop relative to a market price.

Other sell order rules using the rate of return stop are specifically contemplated. For example, FIG. 3 shows a sell order trigger based upon a change in the rate of return. If the investor chose a rate of return methodology in which, beyond the minimum desired rate of return of 10%, 301, if the market price, 302, continues to increase beyond inflection point 303 in a manner that the rate of return increases, then the sell order could be defined as the highest achieved rate of return, less 1%. In this example, if the highest achieved rate of return 304 is at 12%, the sell order trigger would occur at inflection point 305, or 11%, or the highest achieved rate of return of 12% less 1%.

Figure 4:
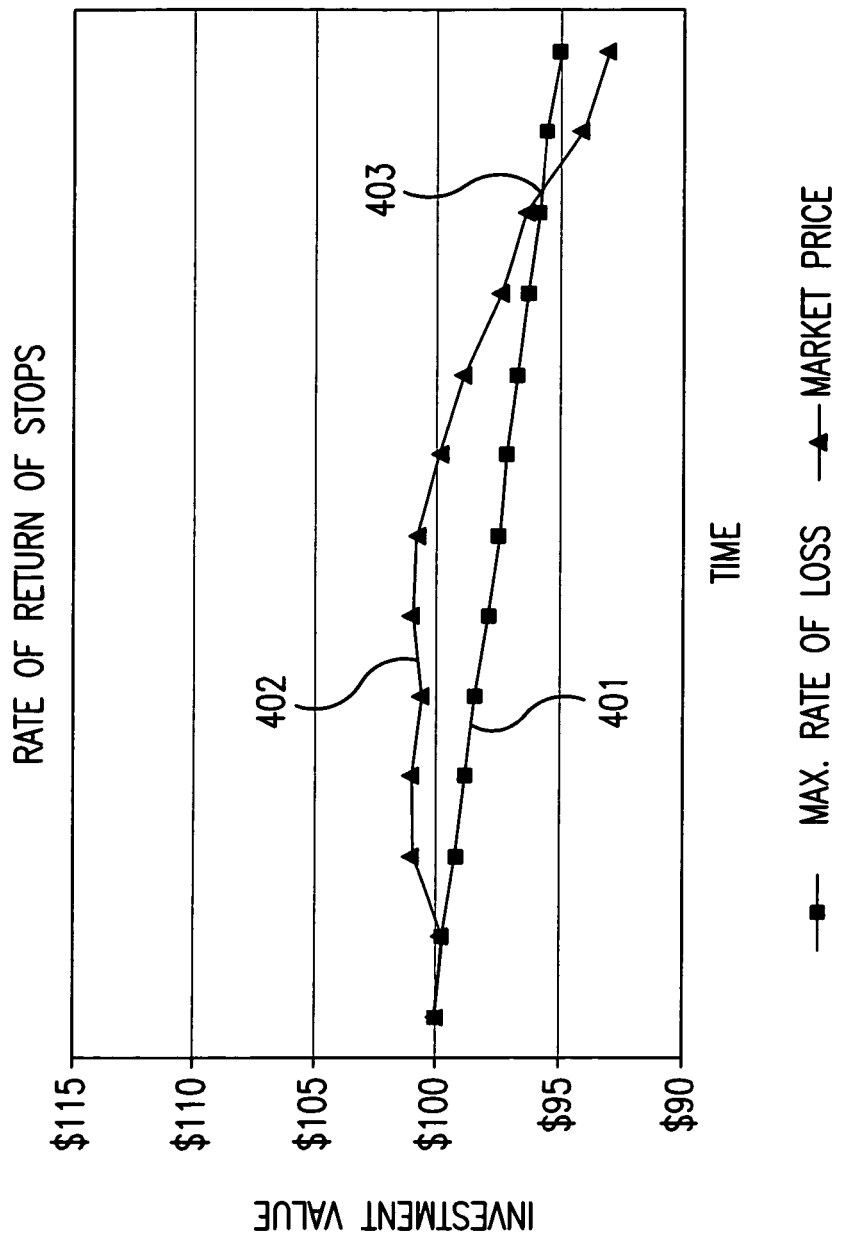
FIG. 4 graphically illustrates the maximum rate of loss stops relative to a market price.

Just as aforementioned triggering methodologies automatically protect capital gains, maximum rate of loss threshold triggers a sell order for purposes of protecting the investment from further loss. As shown in FIG. 4 the maximum rate of loss plot, 401, depicts each trading day's value based upon the purchase price (with possible adjustments for commissions) and the maximum rate of loss. As time passes, the value decreases, representing the time value of money concept. So long as the market price, line 402, remains above the maximum rate of loss plot, 401, the sell order is not triggered. If the market price 402 declines to the maximum rate of loss plot, 401, at inflection point 403, then a sell order and notification is automatically executed. One skilled in the art would understand that the means described for protecting capital gains can be used in combination with this means of protecting from a loss, as shown in FIG. 4.

Figure 5:
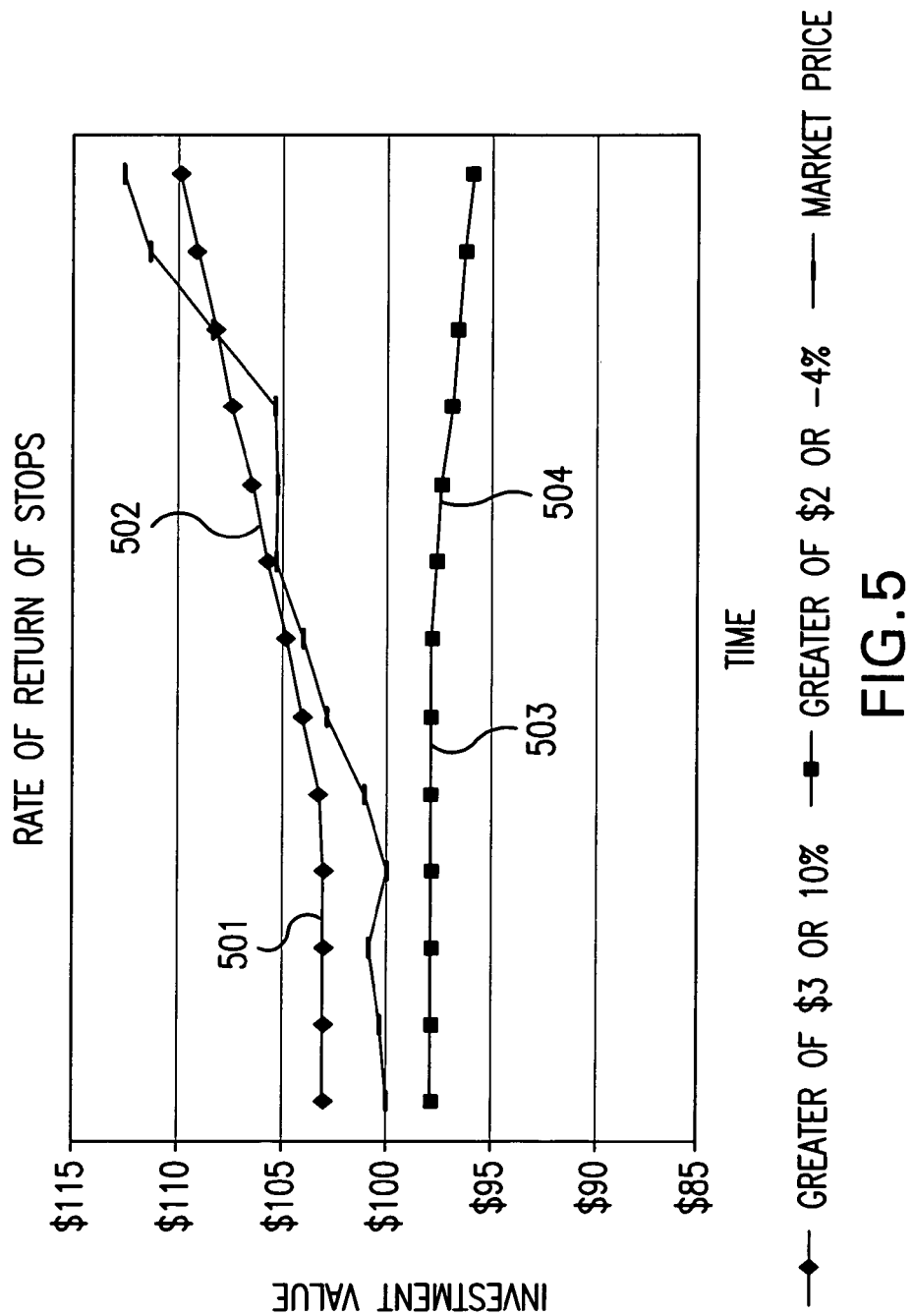
FIG. 5 graphically illustrates the minimum rate of return and maximum rate of loss stops relative to a market price, in combination with other common stops.

Rate of return stops can also be used in combination with commonly used stops. As shown in FIG. 5, an investor can preset capital gains conditions wherein the greater of $3 (using the absolute value of a common stop), 501, or a 10% (using rate of return stop), 502, to trigger an automatic sell order. FIG. 5 also shows that an investor can protect the loss conditions using a combination of a common stop and a rate of return stop. For example, the investor may be able to tolerate a $2 market price decline, 503, for a period of time, and then a 4% rate of loss thereafter, 504.

Figure 6:
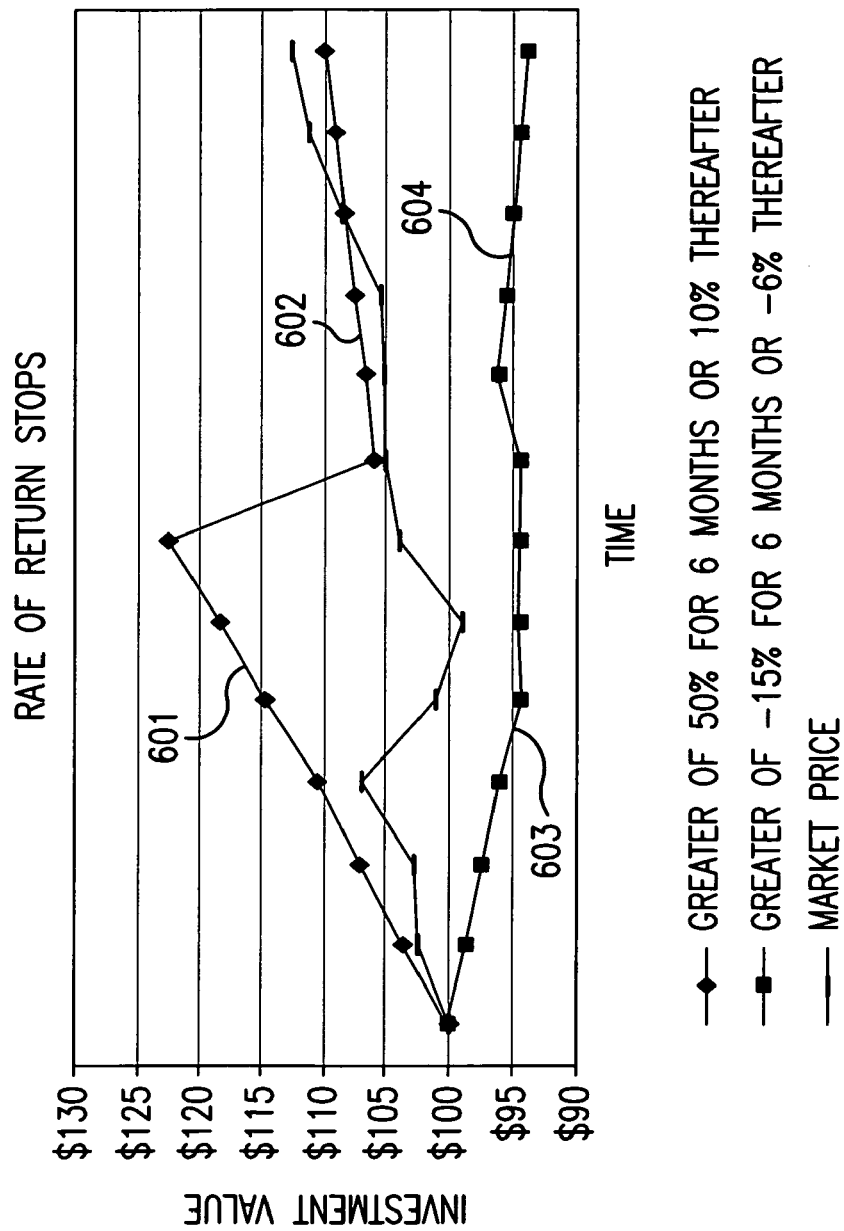
FIG. 6 graphically illustrates exaggerated rates of returns early in the investment, and moderated rates of return thereafter.

Another combination involves rate of return stops exclusively. In circumstances wherein there is a lot of price volatility in investment type (options, for example), or the underlying asset (e.g., the Dow Jones Industrial Index), an investor can choose to preset a very high rate of return early on, and a more moderate rate of return later. Since there is a greater likelihood of a value swing triggering a sell order early in the investment cycle, the investor can establish a very high rate of return early on. For example, on a stock purchased at $100 with a desired return of 10%, after 1 month, the trigger value is $100.80. There is a great likelihood of a stock price moving more than 80 cents in a month. As shown in FIG. 6, if instead a desired rate of return of 50%, 601, is established in the 6 months, converting to 10%, 602, thereafter, the trigger point would be $110.67 at the 3-month point and $122.47 at the 6-month point. Just as an exaggerated rate of return can be established early on to protect near term capital gains, an exaggerated rate of loss can also be used in the near term to protect losses. Also shown in FIG. 6, is a rate of loss of 15%, 603, in the first six months, converting to a 6% loss rate, 604, thereafter. At the three-month point the trigger approaches a value of $96.02, or a $3.98 loss. At the nine-month point, the trigger value becomes $95.47.

Rate of return stops can also be used to simultaneously monitor the valuation an option, future or other derivative and the value of their underlying stock, bond, or other asset. Unlike traditional stops, rate of return stops have the capability to simultaneously monitor the option (or other derivative) market price, as well as the underlying stocks (or other base asset) market price, and determining the best combinations of returns. This simultaneous rate of return evaluation methodology can evaluate investments singly, in aggregate, or by best combinations. The investor's exposure to taxation laws—treatment of capital losses or favorable tax treatment for long term holdings—can also be factored into the rate of return criteria. One skilled at the art could extrapolate other combinations using this concept with the use of put options, futures contract, and innumerable hedging strategies.

Capital Returns

The capital return aspect of the present invention provides two simultaneous benefits to investors. First, upon meeting certain criteria, the broker returns some portion of the initial capital to the investor for purposes of investment. The other investor benefit is to continue to enjoy ongoing capital gains on the first investment.

Figure 7:
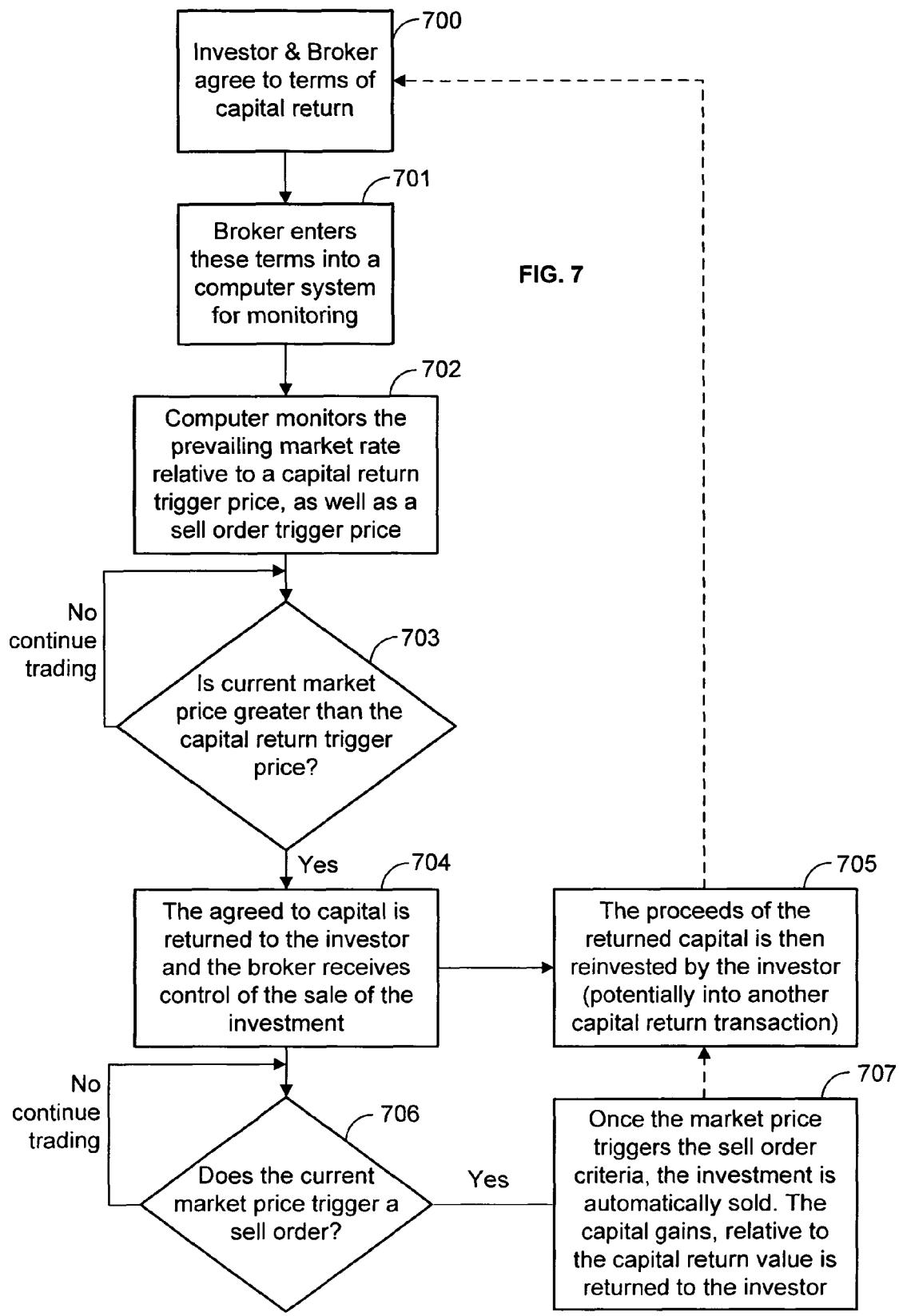
FIG. 7 is a block diagram showing the capital return aspect of the present invention.

The capital return transaction can implement an agreement between the investor and broker at the time of purchase or anytime prior to the sale of the investment, 700 in FIG. 7. The terms of this agreement can include, but are not limited to, the following:

The market price that triggers the return of capital to the investor, stated as an absolute value or a percentage increase.

The percentage or absolute value of the initial capital to be returned to the investor by the broker.

An agreement as to whether the investor is mandated to invest the returned capital.

A simultaneous transfer, or deeding over, the investment from the investor to the broker.

Preset criteria for which the broker can automatically sell the investment, thereby protecting the investor's capital gain as well as the value of the broker's collateral.

The agreed to commission structure for such a transaction.

As shown in FIG. 7, this information can be entered into a computer, 701, for ongoing monitoring purposes, 702. If, at 703, the market price does not reach the agreed to price that triggers the capital return transaction, trading continues. If, at 703, the market price reaches the agreed to price that triggers the capital return transaction, the agreed to capital is returned to the investor at 704. The investor can reinvests the returned capital, potentially into another capital return transaction, 705. If at 706, the market price does not exceed the agreed to sell order price, trading continues. If at 706, the market price exceeds the agreed to sell order price, the capital gains (sales price less the value of the returned capital) is returned to the investor, 707, thereby creating even more capital for reinvestment. Not shown is a condition in which the investment's value declines relative to a preset threshold and the investment is automatically sold. This threshold can be set above the initial purchase price, thereby preserving the investor's capital gains, as well as the broker's collateral.

The market price that triggers the capital return transaction should be greater on a per unit basis than the amount of capital returned. Since this transaction involves the transfer of assets—cash for stock, for example—the broker should have significant collateral coverage in the event of a sharp decline in market valuation. Generally the agreed to market price that triggers this transaction represents an appreciated value relative to the initial purchase price. Those skilled in the art would understand that the amount and structure of this concept could manifest in myriad ways.

The percentage of the initial invested capital to be returned to the investor will depend upon the risk tolerance of the broker. The higher the market valuation relative to the initial purchase price, the higher the percentage (potentially up to 100%) the broker is likely to return to the investor. The amount of capital returned can be stated in numerous ways: as a percentage of the initial invested capital, in absolute value terms (price per unit/share of price per unit/share times the number of involved units/shares), or as a percentage of the prevailing market price. The most expedient form of returning capital would involve a credit to the investor's account, although it can also be in the form of a check, money transfer, or other unspecified means. It also needn't be in the form of the native or other currency. It could be also be another asset of value, such as stocks, bonds, commission credits (to promote even more trading), or some combination thereof.

The asset exchange transaction—the simultaneous return of a portion of the capital to the investor in exchange for the broker's contractual rights to the investment—must have full recognition of each party's rights. The investor must have the confidence that the capital is returned relative to the agreement. The broker in this type of transaction should acquire full control of the asset (absent the rights to the appreciation) for purposes of collateralization, as well as "superior value" to hedge against a rapid, sharp decline in market valuation. (Note that it is not necessary for the broker to have the stock deeded over for collateral. Instead, by having full control of the sell order criteria, the broker could enjoy the same protection.)

The agreement regarding the conditions upon which the investment is sold is for the mutual benefit of the investor and the broker. The investor's goal is to continue to enjoy the appreciated value—measured as a rate of return or otherwise—and to protect established capital gains. The broker seeks to have a certain means of liquidating the investment well above the unit value of the capital returned. Having a mutual agreement around the terms of triggering a sell order aligns the objectives, as well as the necessary assurances of both parties.

By example, an investor and broker can have the following capital return agreement.

The investor buys a stock at $100.

Once the market price reaches $105, the capital return contract is triggered.

The stock is simultaneously deeded over to the broker and the broker returns 80% of the invested capital, or $80 per share.

Although the broker holds the investment, ongoing capital gains belong to the investor.

If the market value falls below $2 relative to its highest appreciated value, the broker has the right to automatically sell the stock.

Using this example, at such time that the market price reaches $105, the investor receives $80 per share for purposes of investing. Not only does this facilitate potential diversification, by maintaining the ongoing appreciation of the first investment and simultaneously having a second, the investor enjoys an interest free compounded rate of return. The broker has a positive net asset position, holding a stock valued at $105 per share in exchange for an $80 per share cash outlay. The broker also generates an incremental commission on the second investment. This incremental commission far exceeds what the broker would have earned in interest on a margin account. Therefore there is no need to charge interest. In an embodiment of this invention, the broker would have a commission structure based upon a percentage of capital gains, thereby having even more incentive to mange this type of transaction. So in the aforementioned example, if the stock reaches a high of $112 and it is automatically sold at $110, the investor could split a portion of the $10 per share capital gain with the broker.

Figure 17:
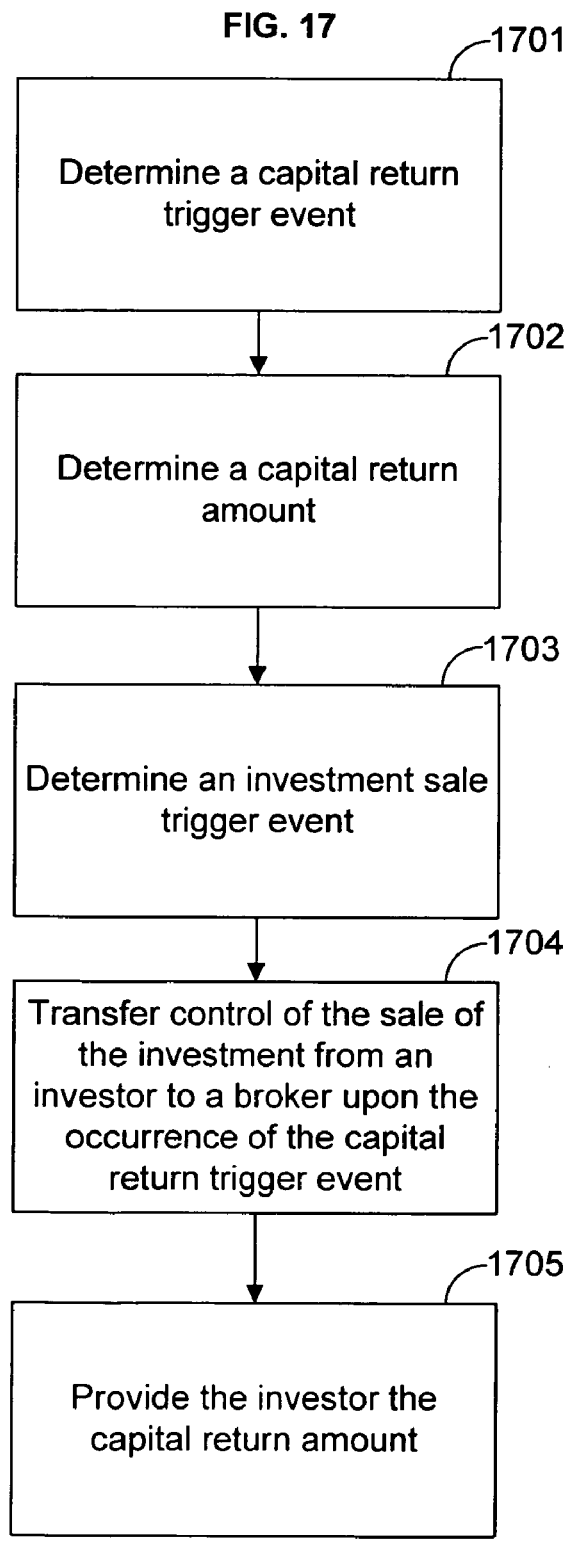
FIG. 17 is a block diagram showing the returning a portion of capital in an investment aspect of the present invention.

Illustrated in FIG. 17 is an exemplary method for returning a portion of capital in an investment. A capital return trigger event can be determined at 1701. A capital return amount can be determined at 1702. An investment sale trigger event can be determined at 1703. Control of the sale of the investment can be transferred from an investor to a broker upon the occurrence of the capital return trigger event at 1704. The investor can be provided the capital return amount at 1705.

The capital return trigger event can occur when a current market price of the investment is less than or equal to a sell order trigger price. Alternatively, the capital return trigger event can occur when a current market rate of return is greater than or equal to a predetermined rate of return. The investment sale trigger event can occur when a current market price of the investment is less than or equal to a sell order trigger price.

The method can also determine if a current market price of the investment is less than or equal to the sell order trigger price. The method can sell the investment if the current market price of the investment is less than or equal to the sell order trigger price. Also, the method can sell the investment if the current market price of the investment approaches the sell order trigger price.

Transferring control of the sale of the investment can include transferring ownership of the investment from the investor to the broker or merely transferring a right to sell the investment from the investor to the broker. The predetermined rate of return can be adjusted for a factor such as, transaction costs, management expenses, tax consequences, dividends, DRIPS's, and bond coupons. The sell order trigger price can be adjusted for a factor such as, transaction costs, management expenses, tax consequences, dividends, DRIPS's, and bond coupons.

One skilled in the art will understand technicalities that apply to both aspects of the present invention. The term "broker" can represent a person that executes an order on behalf of an investor, such as a full line broker or a specialist. A "broker" could be a system that an investor accesses directly, much as one would do with a discount broker via the internet. It could also involve a combination, wherein a full line broker sets up the transaction and the investor has online capabilities to make modifications.

There is also a recognition throughout that market pricing can be evaluated on a discrete or continuous basis. A continuous basis of evaluation can increase the likelihood of capturing market gains and protecting losses. A continuous basis of evaluation is also more volatile than discrete approaches, such as daily close quotes.

It is also understood that a target price for either a stop order or the capital return market price that triggers a capital return or sale, can be treated in one of two ways. The target price is either a point at which an action is initiated (e.g., a sell order) or the guaranteed price at which a broker agrees to settle. In the former approach, the investor faces all the risk. For example, the market valuation may be declining rapidly and/or other sell orders are "ahead". Therefore, in today's environment, if a stock is trading at $45 and the targeted minimum selling price is $40, the broker waits until the market price is actually $40. In a rapidly declining market actual price at which the stock is sold is likely to be significantly less than $40. The latter approach, wherein the broker guarantees the settled price, requires the broker to anticipate when to sell ahead of the guaranteed level. Using the same example, if a stock is trading at $45 and the targeted selling price is $40, the broker can choose to sell as the market price approaches $41. Because the broker anticipates the sale, the actual price at which the stock is sold could instead be between $41 and $40. This can be of enough benefit to investors that they can be willing to pay a premium for the service. The broker meanwhile would be in a better position to manage such a risk. So if the actual settled price is $40.74, the $0.74 improvement could either go to the broker for assuming the risk, or the investor, or shared.

Throughout the discussion of the present invention, there is recognition of commissions applied to the purchase of investments. One skilled in the art would understand that the full cost of the transaction should be factored into rate of return considerations.

Because of the higher rate of return associated with both aspects of the present invention, brokers are in a position to price commissions differently. Instead of earning a flat commission at the time the investment is purchased, brokers could structure the commissions such that they receive a percentage of the capital gains, and thereby reduce the upfront commissions. Not only would this be an incremental revenue source, it would this be an incremental revenue source, it also aligns well with the interest of investors. Since this incremental commission is only paid when a capital gain is realized, there is little risk to the investor. Moreover, the investor would realize a time value of money benefit, wherein they pay less initially and defer the capital gains based commission. In the case of full service brokers, it only pays if their investment advice yields results. This commission approach could be structured in myriad ways.

In combination, both aspects of the present invention—the rate of return stop and the capital return—offer investors with greater potential after tax returns, and better protection against market risks.

SYSTEMS DESCRIPTION OF THE INVENTION

It is envisioned that both aspects of the present invention will be processed with the support of computer systems. The following describes the proposed system usage.

Figure 8:
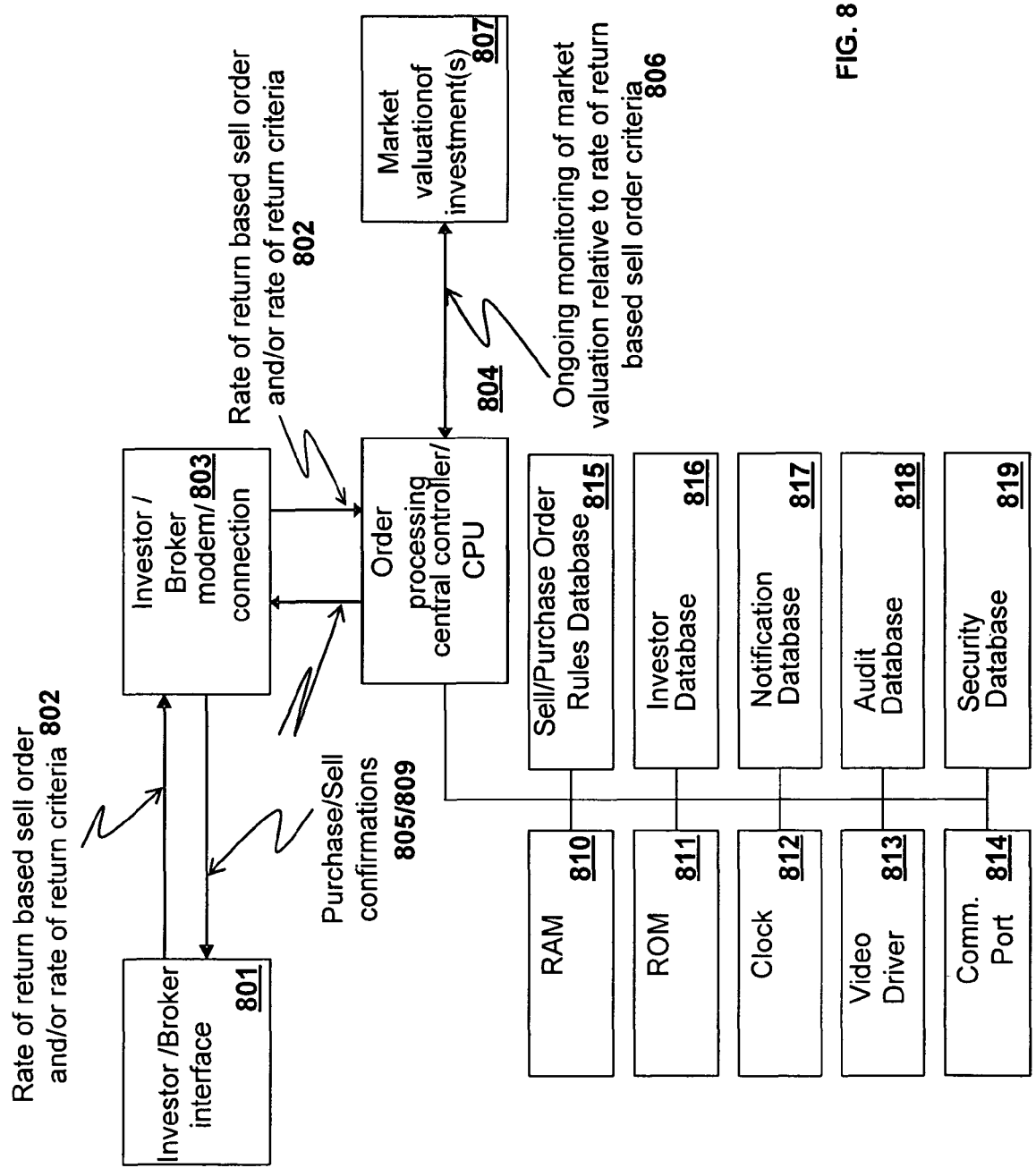
FIG. 8 is a system diagram of the present invention.
Figure 9:
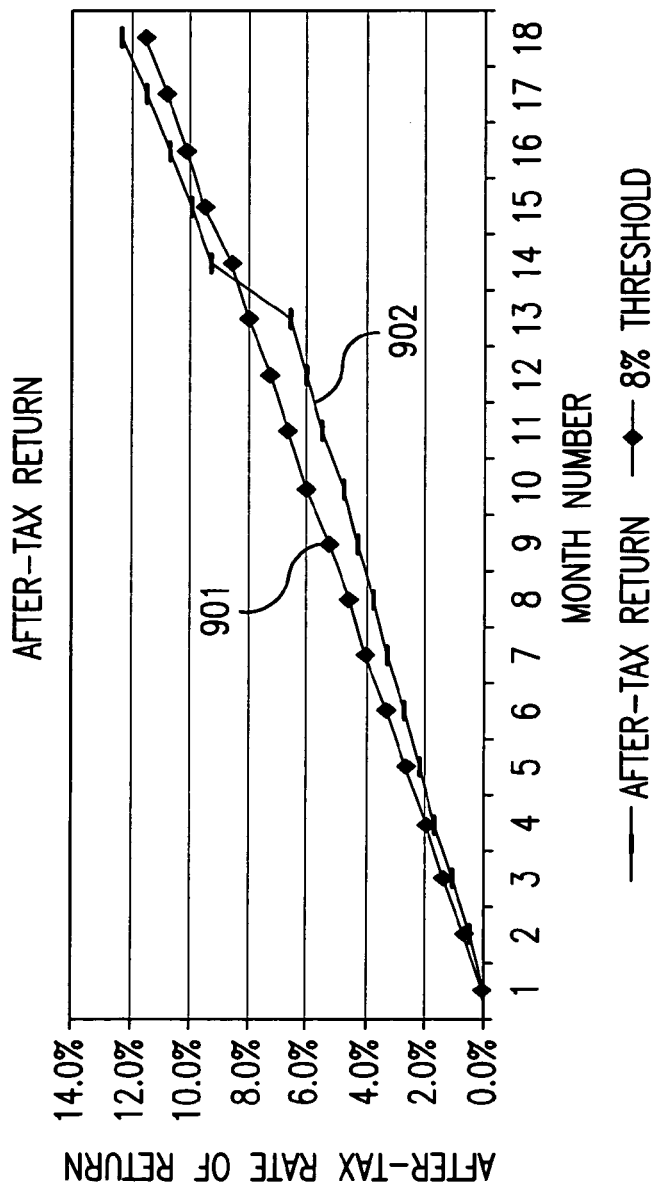
FIG. 9 graphically illustrates tax impact on a rate of return calculation.

The system diagram in FIG. 8 shows the involvement of computers to process the capital return sell order as well as the rate of return transaction. The Investor/Broker interface, 801, represents either the placement of these transactions directly into broker's system (via the internet, kiosk, or other electronic means) or by means of the investor's verbal instruction to the broker for subsequent entry into the broker's system. The investor's order, 802, could contain information related to the desired purchase price, rate of return sell order criteria and/or the capital returns agreement with the broker. This information is transmitted via an electronic means, 803, such as a modem, internet, intranet, direction connection or other means.

Once the order is transmitted to order processing central controller/CPU, 804, the pertinent information is stored and processed in its component parts. The processing components may include but are not limited to the RAM, 810, the ROM, 811, the clock, 812, video driver, 813, and communication port, 814. The databases utilized include a sell order rules, 815, investor, 816, notification, 817, audit, 818, and security, 819. The sell order rules database, 815, contain most of the pertinent information related to the rate of return stop and capital return agreement, including the minimum rate of gain and maximum rate of loss criteria, the percentage of capital to be returned, and other details herein the description of the invention. The investor database, 816, may include the investor's name, social security/federal tax identification number, address, and other investor profile information. The database could also include account balances, as well as other investments with corresponding sell order and capital return information.

The notification database, 817, contains information that generates a confirmation of the investment transaction, 805, including the rate of return sell order criteria and/or capital return agreement details. These elements are constantly monitored, 806, relative to the prevailing market valuation(s), 807, of the underlying investment.

Once the investment meets the rate of return sell order criteria and/or one of the conditions of the capital return agreement are met, the order processing central controller/CPU, 804, generates a notification, 809, using the investor, 816, and notification, 817, databases.

While there are innumerable ways systems can be configured to process rate of return stops and capital return agreements, the described method encompasses the major elements of these transactions.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

An implementation of the disclosed method may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices.

While this invention has been described in connection with embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer implemented method for managing an investment comprising:
   receiving, by a computer system, a desired rate of return for a first investment, wherein the desired rate of return considers time value of money; and
   determining, by the computer system, whether a trigger event for a future trading period has occurred based on the desired rate of return, wherein determining whether the trigger event has occurred comprises:
      calculating, by the computer system, for each of a plurality of future trading periods, a desired market price of the first investment corresponding to the desired rate of return, wherein the plurality of future trading periods comprise a plurality of days, and wherein calculating, for each future trading period, a desired market price comprises calculating the desired market price corresponding to the desired rate of return on an annualized basis; and
      comparing, by the computer system, a current market price of the first investment for the future trading period to the desired market price associated with the future trading wherein the trigger event occurs when the current market price is greater than or equal to the desired market price.

2. The method of claim 1 wherein the trigger event further occurs when a current market price of the first investment is greater than or equal to a sell order trigger price.

3. The method of claim 2 further comprising:
   determining if a current market price of the first investment is greater than or equal to the sell order trigger price.

4. The method of claim 3 further comprising:
   increasing the sell order trigger price in response to an increase in the current market price of the first investment.

5. The method of claim 3 further comprising:
   selling the investment if the current market price of the first investment is greater than or equal to the sell order trigger price; and
   notifying a user of the sale.

6. The method of claim 1 wherein the trigger event further occurs when a current market rate of return of a second investment is greater than a current market rate of return on the first investment.

7. The method of claim 6 further comprising:
   selling the first investment if the trigger event occurs;
   purchasing the second investment; and
   notifying a user of the sale and purchase.

8. The method of claim 1 wherein the first investment is a group of investments.

9. The method of claim 1 wherein the desired rate of return is adjusted for a factor selected from the group consisting of:
   transaction costs;
   management expenses;
   tax consequences;
   dividends;
   DRIPS's; and
   bond coupons.

10. A computer implemented method for managing an investment comprising:
    receiving, by a computer system, a maximum rate of loss for a first investment, wherein the maximum rate of loss considers time value of money, wherein the maximum rate of loss is constant relative to a purchase price of the first investment; and
    determining, by the computer system, whether a trigger event for a future trading period has occurred based on the maximum rate of loss, wherein determining whether the trigger event has occurred comprises:
       calculating, by the computer system, for each of a plurality of future trading periods, a market price of the first investment corresponding to the maximum rate of loss received, wherein the plurality of future trading periods comprise a plurality of days, and wherein calculating, for each future trading period, a market price comprises calculating the market price corresponding to the maximum rate of loss on an annualized basis; and
       comparing, by the computer system, a current market price of the first investment for the future trading period to the calculated market price associated with the future trading period, wherein the trigger event occurs when the current market price is less than or equal to the calculated market price.

11. The method of claim 10 wherein the trigger event further occurs when a current market price of the first investment is less than or equal to a sell order trigger price.

12. The method of claim 11 further comprising:
    determining if a current market price of the first investment is less than or equal to the sell order trigger price.

13. The method of claim 12 further comprising:
    selling the first investment if the current market price of the investment is less than or equal to the sell order trigger price; and
    notifying a user of the sale.

14. The method of claim 10 wherein the trigger event further occurs when a current market rate of loss of a second investment is less than a current market rate of loss on the first investment.

15. The method of claim 14 further comprising:
    selling the first investment if the trigger event occurs;
    purchasing the second investment; and
    notifying a user of the sale and purchase.

16. The method of claim 10 wherein the first investment is a group of investments.

17. The method of claim 10 wherein the rate of loss is adjusted for a factor selected from the group consisting of:
- transaction costs;
- management expenses;
- tax consequences;
- dividends;
- DRIPS's; and
- bond coupons.

18. A computer program product comprising at least one computer-readable storage medium having computer-readable program code portions stored therein, wherein the computer-readable program code portions comprise:
- a first executable portion for receiving a desired rate of return for a first investment, wherein the desired rate of return considers time value of money; and
- a second executable portion for determining whether a trigger event for a future trading period has occurred based on the desired rate of return, wherein determining whether the trigger event has occurred comprises:
  - calculating for each of a plurality of future trading periods, a desired market price of the first investment corresponding to the desired rate of return, wherein the plurality of future trading periods comprise a plurality of days, and wherein calculating, for each future trading period, a desired market price comprises calculating the desired market price corresponding to the desired rate of return on an annualized basis; and
  - comparing a current market price of the first investment for the future trading period to the desired market price associated with the future trading period, wherein the trigger event occurs when the current market price is greater than or equal to the desired market price.

19. A computer system comprising:
a processor configured to:
- receive a desired rate of return for a first investment, wherein the desired rate of return considers time value of money; and
- determine whether a trigger event for a future trading period has occurred based on the desired rate of return, wherein in order to determine whether the trigger event has occurred, the processor is further configured to:
  - calculate, for each of a plurality of future trading periods, a desired market price of the first investment corresponding to the desired rate of return, wherein the plurality of future trading periods comprise a plurality of days, and wherein calculating, for each future trading period, a desired market price comprises calculating the desired market price corresponding to the desired rate of return on an annualized basis; and
  - compare a current market price of the first investment for the future trading period to the desired market price associated with the future trading period, wherein the trigger event occurs when the current market price is greater than or equal to the desired market price.

\* \* \* \* \*